(12) United States Patent
Bishop, III et al.

(10) Patent No.: US 11,120,516 B2
(45) Date of Patent: Sep. 14, 2021

(54) SYSTEM AND METHOD FOR REAL ESTATE SPATIAL DATA ANALYSIS

(71) Applicant: MAP IP ONE, LLC, Albany, GA (US)

(72) Inventors: Moye Lynwood Bishop, III, Albany, GA (US); Glenn Arthur Kirbo, Jr., Albany, GA (US)

(73) Assignee: MAP IP ONE, LLC, Albany, GA (US)

( * ) Notice: Subject to any disclaimer, the term of this patent is extended or adjusted under 35 U.S.C. 154(b) by 501 days.

(21) Appl. No.: 15/907,769

(22) Filed: Feb. 28, 2018

(65) Prior Publication Data

US 2018/0189906 A1 Jul. 5, 2018

Related U.S. Application Data

(63) Continuation of application No. 14/211,661, filed on Mar. 14, 2014, now abandoned, which is a continuation of application No. 11/825,184, filed on Jul. 5, 2007, now Pat. No. 8,799,004.

(51) Int. Cl.
*G06Q 50/16* (2012.01)
*G06Q 90/00* (2006.01)
*G06Q 10/06* (2012.01)

(52) U.S. Cl.
CPC ......... *G06Q 50/165* (2013.01); *G06Q 10/063* (2013.01); *G06Q 50/16* (2013.01); *G06Q 90/20* (2013.01)

(58) Field of Classification Search
None
See application file for complete search history.

(56) References Cited

U.S. PATENT DOCUMENTS

| | | | |
|---|---|---|---|
| 7,991,638 B1 * | 8/2011 | House | G06Q 30/0204 705/7.33 |
| 8,010,399 B1 * | 8/2011 | Bruce | G06Q 30/0201 705/7.29 |
| 2002/0077936 A1 * | 6/2002 | Wiese | G09B 29/006 705/26.1 |
| 2003/0033195 A1 * | 2/2003 | Bruce | G06Q 30/0205 705/7.31 |
| 2004/0220906 A1 * | 11/2004 | Gargi | G06Q 30/06 |
| 2005/0055275 A1 * | 3/2005 | Newman | G06Q 30/0205 705/14.41 |
| 2006/0161465 A1 * | 7/2006 | Ramakrishnan | G06Q 30/06 705/7.25 |

OTHER PUBLICATIONS

Richard L. Church, "Geographical information systems and location science," Computers & Operations Research 29 (2002), pp. 541-562. (Year: 2002).*

* cited by examiner

*Primary Examiner* — Christopher B Tokarczyk
(74) *Attorney, Agent, or Firm* — Thomas Horstemeyer, LLP

(57) ABSTRACT

A system and method for providing real estate spatial analysis through a user interface which allows the user to visualize the analysis through maps. A region is determined that includes multiple retail locations. Retail location data values are determined using a distance from respective ones of the retail locations. An average data value is calculated. A map of the geographic region is generated including a trade area for respective ones of the retail location.

20 Claims, 20 Drawing Sheets

| Store Name | Income1 | Income3 | Income5 | 2004Pop1 | 2004Pop3 | 2004Pop5 | 2000Pop1 | Closest Store | Average Distance |
|---|---|---|---|---|---|---|---|---|---|
| Site Demographics | 82,826.00 | 96,751.00 | 98,993.00 | 7,889.00 | 58,104.00 | 144,040.00 | 7,354.00 | | |
| BJs | 57,379.00 | 80,164.00 | 92,622.00 | 8,036.00 | 72,995.00 | 194,643.00 | 7,256.00 | 2.40 | 2.40 |
| CostCo | 66,506.00 | 90,160.00 | 98,987.00 | 9,890.00 | 57,344.00 | 125,182.00 | 8,010.00 | 3.10 | 3.10 |
| CVS_Eckerds | 82,826.00 | 96,751.00 | 98,993.00 | 7,889.00 | 58,104.00 | 144,040.00 | 7,354.00 | 5.00 | 8.20 |
| Home_Depot | 94,649.00 | 99,376.00 | 102,903.00 | 7,697.00 | 55,664.00 | 148,425.00 | 6,809.00 | 1.60 | 1.60 |
| Kohls | 150,087.00 | 122,928.00 | 111,454.00 | 8,246.00 | 44,800.00 | 128,288.00 | 7,902.00 | 3.40 | 3.40 |
| Kroger | 83,644.00 | 99,895.00 | 97,571.00 | 9,867.00 | 56,888.00 | 148,979.00 | 9,486.00 | 2.10 | 2.10 |
| Lowes | 58,742.00 | 83,714.00 | 98,282.00 | 8,982.00 | 49,994.00 | 150,656.00 | 8,042.00 | 3.00 | 2.80 |
| Publix | 99,971.00 | 108,544.00 | 107,827.00 | 7,854.00 | 57,402.00 | 147,413.00 | 7,826.00 | 2.00 | 1.60 |
| Target | 95,768.00 | 101,742.00 | 104,829.00 | 7,778.00 | 62,414.00 | 154,059.00 | 7,144.00 | 0.20 | 1.00 |
| Walgreen | 114,958.00 | 98,279.00 | 101,711.00 | 6,891.00 | 53,156.00 | 137,955.00 | 6,805.00 | 0.20 | 0.50 |
| Walmart | 70,772.00 | 97,093.00 | 100,700.00 | 9,992.00 | 49,488.00 | 125,662.00 | 9,024.00 | 0.20 | 0.90 |

Site's Value
- Value Exceeds
- Value is Comparable
- Value is Deficient

SYSTEM AND METHOD FOR REAL ESTATE SPATIAL DATA ANALYSIS

CROSS-REFERENCE TO RELATED APPLICATIONS

This application is a continuation of and claims priority to application Ser. No. 14/211,661, filed on Mar. 14, 2014 and titled "System and Method for Real Estate Spatial Data Analysis," which is a continuation of application Ser. No. 11/825,184, filed on Jul. 5, 2007, and titled "System and Method for Real Estate Spatial Data Analysis," and these Applications are hereby incorporated herein by reference in their entireties.

BACKGROUND

The market for real estate information analysis is in its infancy. Traditionally, the real estate model has been broker-centric. The local real estate broker controls much of the localized information about a property becoming a necessary middle man for projects ranging from buying a house to selling a shopping center. With the advent of the Internet and its efficient method for disseminating information, more and more real estate information has become publicly available. This information, however, is spread out in multiple formats on various websites, databases, and other sources. This makes it very difficult, time consuming and expensive to compile sufficient information to make real estate purchase decisions. Real estate opportunities are often missed because of the time it takes to get actionable information on a site.

Traditionally, real estate brokers and site selectors find potential commercial real estate sites for developers and tenants. One conventional method used by site selectors to find potential sites in a new area involves driving around the area and noting the location and quality of the different neighborhoods, and the location and quality of the existing commercial corridors. Thus the site selector will try to derive a potential store location's quality based on his observed quality of the surrounding area. The significant amount of time required to become familiar with an area is a reason why many developers and tenants turn to local real estate brokers for help. Another conventional method used by site selectors is to mark locations of existing retail stores on a map. This conventional method helps the site selector determine how far away a potential site is located relative to an existing retail store. One known approach used by commercial real estate site selectors makes use of paper maps with stickers to indicate store locations. Another known approach is to disseminate copies of books with hand marked store locations.

Once a developer or tenant's site selector finds a potential site, a conventional method involves ordering a demographic report from an in-house specialty team or outside consultant service. The demographic data for the potential site is then compared to a tenant's stated demographic requirements to determine demographic viability of a site. Additionally, tenants will often state how close they are willing to place stores together. This stated distance is compared to the distance the site selector marked for the site on his paper map to the known store locations. If the demographics and closest store distance meet the stated requirements for a particular retailer, then the developer will often move forward with plans to acquire and present the site to a tenant for development. These conventional methods must be repeated for each potential site, creating significant time and cost inefficiencies.

The problem with this conventional method of determining site viability is that there is a significant information and time gap between the site selector's first observation of a site and the developer's acquisition decision.

In view of the foregoing, there is a need to overcome the limitations of the conventional methods for finding site locations and determining site viability. There is a need to efficiently inform a site selector of the quality and location of the neighborhoods and commercial corridors without the site selector having to drive throughout the area or depend on a local broker. There is a further need to inform the site selector of a retailer's demographic and closest store distance requirements in a localized region, not just a generalized stated requirement. There is a further need to inform the site selector at the time of first observation whether the site's demographics and location to the nearest existing retail store meet the requirements of a particular retailer in a particular region. There is a further need to create a standard unified model to collect and disseminate site information throughout a commercial development organization to facilitate efficient site acquisition decisions.

SUMMARY

In the context of commercial real estate, the present invention aims to make necessary decision making information available, almost instantly, to the decision maker in a format that is uniform and easy to understand.

The present invention provides a system and method for analyzing geospatial variables. In a commercial real estate context, the system provides methods for determining location criteria when analyzing real estate locations. These methods include: a method for evaluating a potential real estate site based upon an average distance between existing retailer locations; A method for viewing existing retailer trade areas on a map based on an average distance between existing retailer location; a method for evaluating a potential real estate site based upon an average demographic variable value among existing retailer locations; a method for viewing existing retailer trade areas on a map based on an average demographic variable value among retailer locations in a region; a method to view property values on a map; and a method for coloring a map based upon business types located in a geographic area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows an exemplary data display illustrating an exemplary embodiment of an interface to record information about a real estate location.

FIG. 6A shows an exemplary data display illustrating an exemplary embodiment of an interface used to display data and a map for making real estate decisions and analysis.

FIG. 6B shows an exemplary data display illustrating an exemplary embodiment of an interface used to display data and a map for making real estate decisions and analysis.

FIG. 8 shows an exemplary data display illustrating an exemplary embodiment of an interface used to display demographic and geospatial variable comparisons.

DETAILED DESCRIPTION

The system of the present invention, includes an exemplary embodiment that enables buyers and sellers to identify and analyze commercial real estate opportunities. The system includes, but is not limited to, the following: a large scale database of business locations, associated demographics and environmental variables; a user interface for selecting which locations, demographics, and environmental variables to analyze; a user interface and method for displaying the results of such analysis; and, a method for the collection and distribution of source data and analysis. The system provides an efficient and detailed analysis by presenting the user with a method to collect and store data in the field, produce analysis to determine the viability of a commercial real estate site or project, and save the results for future display, distribution, and review. By providing a unified data model and a system for forming a variety of queries against the unified database, it is possible to understand with precision the relationship between market factors that have heretofore only been understood in an anecdotal way. In this sense, the present invention resides in the interconnection of related pieces of information that allows a true understanding and deep appreciation of a commercial real estate market. The user of the system of the present invention has the ability to understand data in context because the data in one data source is influenced by other data sources that have heretofore not been connected.

Figure 1:
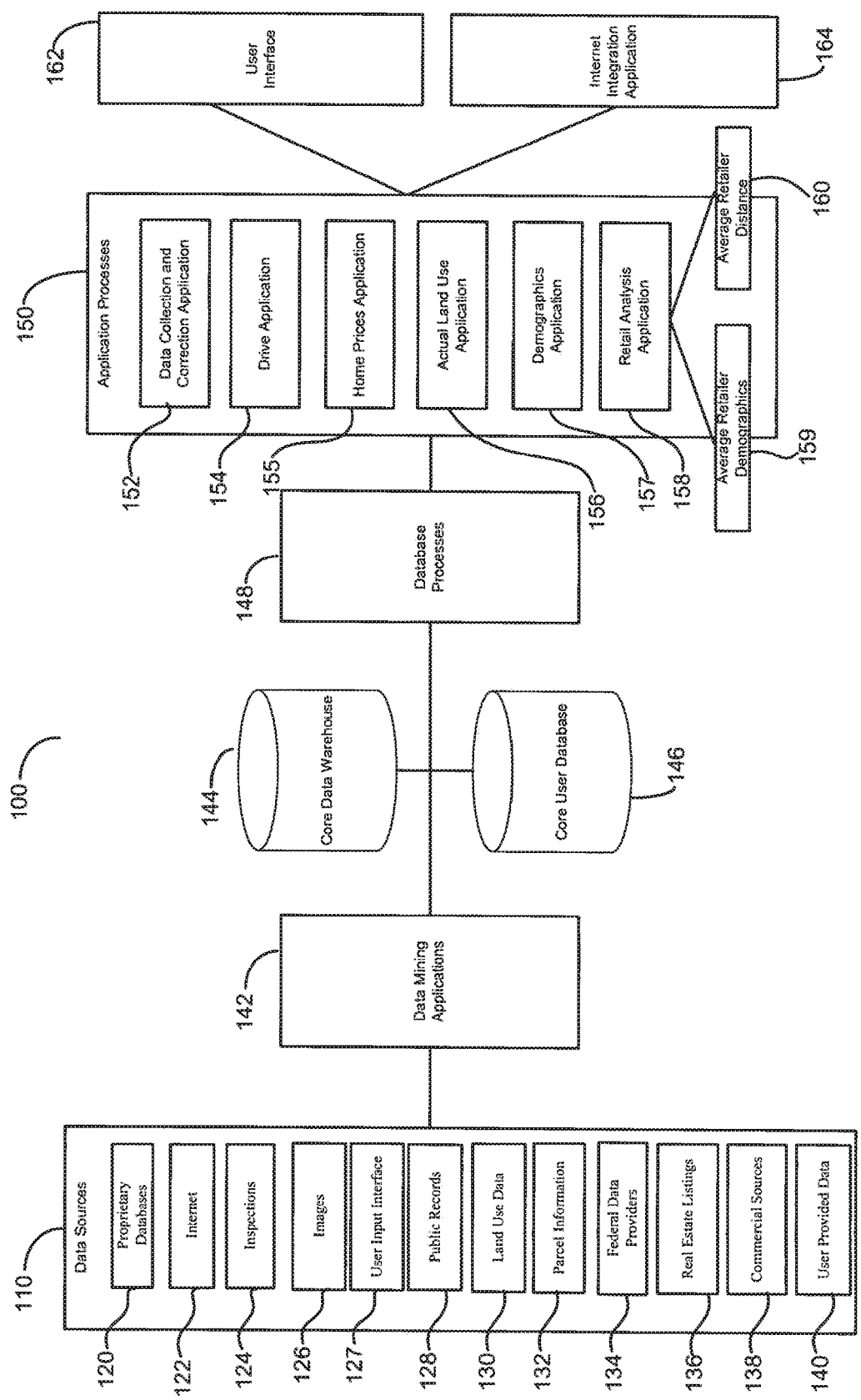
FIG. 1 shows the overall system architecture of the present invention, according to an exemplary embodiment of the present invention.

FIG. 1 shows the overall system architecture 100 of an exemplary embodiment of the present invention. As shown, the principal components of the system architecture 100 include: data mining applications 142, data sources and storage mechanism 110, database processes 148, a user interface 162, and internet integration applications 164. The user interface 162 directs data mining applications 142 to obtain commercial real estate and other information from data sources 110. The data mining applications 142 gather, organize, and transmit the information to a central core data warehouse 144 or core user database on a local computer 146 where data processes 148 access the information and organize it for manipulation by application processes 150 and the user interface 162 or internet integration application 164 which then presents the information to the end user for review and manipulation. In terms of input and output, data sources 110, the user input interface 127 and data mining applications 142 represent the input side of the system architecture while data processes 148, the internet integration application 164, user interface 162, and printouts represent the output side to which an end user of the system is connected.

Data Sources 110 include but are not limited to proprietary databases 120, the Internet 122, on-site inspections 124, satellite images 126, aerial images 126, fly by inspections in an airplane or helicopter 124, public records 128, land use data 130, parcel information 132, federal data providers such as the USGS 134, real estate listings from the Multiple Listing Service ("MLS") and other providers 136, commercial databases and information sources 138, historical weather information, confidential user provided data such as proprietary sales information 140, and bank deposit information. By conducting continuous, periodic pollings of data sources 110, the data mining application 142 ensures that the core data warehouse 144 and core user database 146 contain up-to-date-information. In a networked environment, each user's computer contains a core user database 146. Each change to a core user database 146 such as adding a site location, is uploaded to the core data warehouse 144 where information may be distributed throughout the enterprise.

The data mining application 142 receives the information from data sources 110, including the Internet 122, into separate modules, applications, and tables including, in one exemplary embodiment of the present invention, a data collection and correction application 152; a drive application 154; a home prices application 155; an actual land use application 156; a demographics application 157; and, a retail analysis application 158 which includes average retailer demographics 159 and the average retailer distance 160 methods.

As data mining applications 142 receive real estate information and other information from data sources 110 and process the impact of that information throughout the modules or applications, the information is stored and constantly updated in a central core data warehouse 144 and each core user database 146. Database processes 148 access this data from the output side of core data warehouse 144 and core user database 146 and create database sets compatible with formats required by each of the aforementioned applications 150. Each application manipulates the database sets in response to commands from a user and presents the results of database manipulations, e.g., search query results, to the user in the form of a graphical user interfaces.

The specific manipulations executed by each of the applications are described below in more detail.

The commercial real estate process will now be described beginning with prior art processes for commercial real estate selection and acquisition. This provides context in which an exemplary embodiment of the present invention operates. Current prior art inefficiencies in the market include the methods traditionally used to select and acquire commercial real estate. The first inefficient method describes how the commercial real estate developer or his agent, ("site selectors"), will typically drive around in a car for several hours a day and look for real estate opportunities. If driving in an unfamiliar territory, site selectors may get lost or have to stop and find the current location on a paper map. The paper map may not be detailed enough to show street names at the site selector's current location. One problem with the traditional prior art method of scouting properties is often times you cannot see the whole property from the road. There may be hidden opportunities or problems that are unseen from the roadway. Another inefficiency is the time period between the first observation of the property, and the act of recording the site information for further review. Often, a site selector sees a property or real estate sign and jots down the information on a piece of paper. Many will try to call and get information while driving past the site. However, if no contact is available, the site selector will have to call the contact back in the future. The difficulty with this prior art method is that often the phone call to the contact is far enough in the future that the site selector has forgotten her mental impressions of the property because there was no system in place to formally record the details of the property. The site selector must also determine to whom he will market or sell the property, and provide a marketing study to show why the property would be a good fit for a particular tenant or purchaser. The traditional prior art method for accomplishing this task involved ordering a study which included demographics and tenant analysis. This study would take a significant amount of time and money to produce. Furthermore, the amount of information included in the reports was fairly limited to complex and difficult-to-understand charts, along with large tables of demographics that listed what the site's demographics were but did not include any analysis of tenant demographic requirements. A conventional method of selling commercial real estate includes significant marketing expense because the marketing involves preparation of lengthy documentation and the system in place is not highly automated. FIGS. 1-18 are slides that graphically depict an exemplary embodiment of the system 100 of the present invention. This exemplary embodiment of the system 100 and method operate within the above-described commercial real estate market and transactional process.

The system 100 of the present invention will now be further described. The system 100 and method of the present invention allows users to perform analysis on geocoded objects through collection, distribution and use of information through a user interface 162 which allows the user to visualize the analysis through maps, text, and colors. In an exemplary embodiment, a commercial real estate application, the system 100 and method provides the user with a visual display and printout which allows the user to make site location decisions and potential tenant analyses. This method helps the real estate developer focus on the best sites when presented with a number of site possibilities. This ensures that sites selected will be quality sites to which the tenants will want to locate and the developer may be able to sell for a profit.

In accordance with the system 100 and method of the present invention, the system 100 presents the user with an interface 127 to record sites and choose which tenants and which tenant analyses to perform. In this context, the user may compare site locations to the tenant analyses. The system 100 will show the user which tenants could locate to the site based on the analyses performed.

One skilled in the art would naturally appreciate that this system of analysis is useful in contexts other than the commercial real estate context including, but not limited to, residential real estate location, and sales analysis.

Drive Application 154

Referring to the graphical depiction in FIG. 2-4, the Drive Application 154 and its various components will now be described. An exemplary embodiment of the Drive Application 154, provides a method for the site selector to record site locations and site information. The Drive Application 154 can be installed on a computer located in a vehicle with the site selector. The advantage of using the system in a car or vehicle is that the user can determine his location and perform analysis while sitting in front of or driving by a site. This instantaneous analysis is critical to determining which retailers could utilize the location, and the developer, site selector, and broker can determine if further review is necessary. Further review could include making a phone call, taking extensive notes, filling out the interactive forms in the system, and sending a purchase contract to the landowner. The user's thoughts, impressions, and observations can be input into the Drive Application 154 while the user is sitting in front of the site. This enables the user to record more extensive and accurate facts about the site than would otherwise be possible if the user were to take notes by hand.

The Drive Application 154 has a unique layout of three interfaces that are interconnected because they pass location data amongst the various modules. These modules include a "GPS" Active Map (Global Positioning System) 200 that tracks the current location of the vehicle 201 and provides real time demographics 204, a Site Information Form 300 to record data about a site, and a Satellite Map 400 that also tracks the current location of the vehicle. Each part of the interface is easily accessible by pressing a button or a tab. When the button or tab is depressed, the respective module will display. Any number of these modules can be displayed at one time. The user can quickly switch between views in order to facilitate complete documentation of a site, in the least amount of time. The specific aspects of the Drive Application will now be described.

GPS Active Map 200

Figure 2:
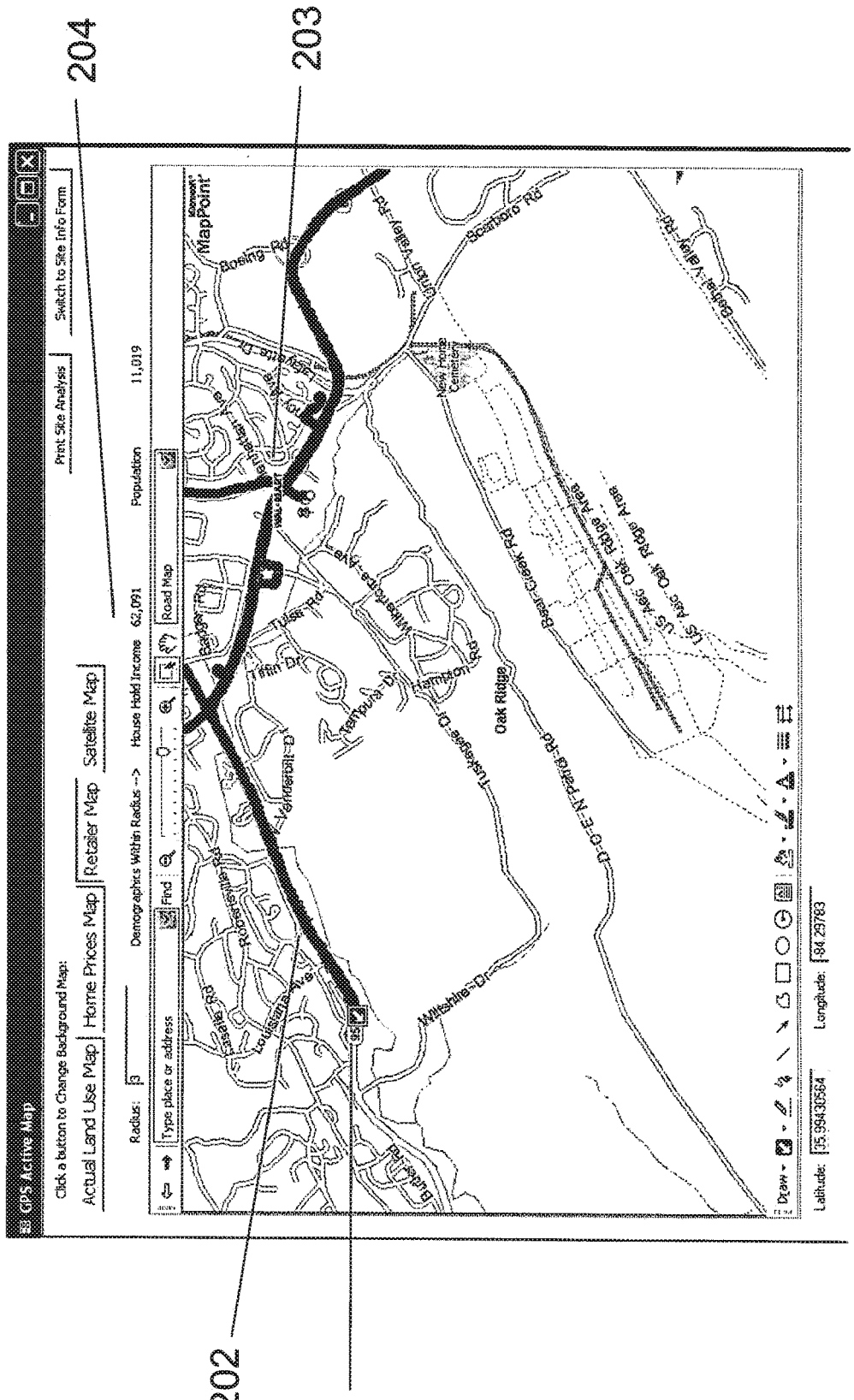
FIG. 2 shows an exemplary data display illustrating an exemplary embodiment of an interface which displays a map with current location information and data to a user.

Referring now to FIG. 2, one aspect of an exemplary embodiment of the present invention is the capability of the Drive Application 154 to record information about the user's present location and any nearby commercial real estate property. The Drive Application 154 accomplishes this by showing the user his real time position on a map 201 using a GPS device to determine location. The real time position 201 indicator prevents the user from becoming lost or requiring him to find his location on a physical map. The GPS device can be embedded in the computer, connected by a wire, or provided via wireless connection. The computer may also receive location information from the vehicle's onboard location/navigation system and the user's cellular telephone. The map 200 will draw a trail 202 so the user can see where he has been. The GPS Device records latitude and longitude and plots a trail on a map interface which allows the user to recall where he has been and where he needs to go to find retail locations. This aspect is good for brokers, site selectors and others who need to know what territory they have covered and what territory remains to be covered. The GPS trail 202 can be saved and added to the core user database 146 of locations traveled along with relevant information about the trip including: the date and time of the trip, information recorded about sites on the trip, information recorded about existing locations, and a collection of images taken at a point in time simultaneously recorded with location information. Users can see their real time location 201 in relation to existing retailer locations that have been geocoded and displayed on the map 203. The map 200 can also be programmed to show other important information to the user such as population density, traffic counts, home prices 1500, and the actual land use 1600. By accessing the core user database 146, the GPS Active Map 200 can show the user real time demographics 204 or other variables for the geospatial area around the current location. This is accomplished by passing the real time latitude and longitude information to a real time demographics application 157 which queries the core user database 146 for demographics which fall within a specified distance from the real time latitude and longitude position. For example, this method could show, as the user is moving in a vehicle, a constantly changing number for population within a 3 mile radius of the current location, average household income within a 3 mile radius of the current location, how many businesses are located within a 3 mile radius of the current location, the predominant type of business within a 3 mile radius of the current location, the average price of a home and how many homes are for sale within 3 miles of the current location. As the vehicle moves these numbers will change as the latitude and longitude of the vehicle's current position changes. The advantage to this aspect of the system is that the user can know, and the computer can alert the user automatically, if the user's current location meets the demographic criteria required by a specific retailer in the surrounding area. The specific retailer's demographic criteria is determined by the average retailer demographics method 1200 described in more detail under the heading "Average Retailer Demographics." Using the GPS Active Map 200 the user can mark a position on the map where he sees a location of real estate about which he wants to record information. When the user clicks on the map, the location information of the clicked location is sent to the Site Information Form 300. This form 300 contains a number of fields that the user can fill out to record information relevant to the site. Alternatively, the computer can automatically generate information about the site using preloaded variables such as retailer locations, stream locations, traffic count data, and street data. Additional detail regarding the Site Information Form 300 is described below in the subheading "Site Information Form". An alternative aspect to this exemplary embodiment is that the user can click anywhere on the GPS Active Map 200 to receive analysis on that location, or to record information, and the user does not have to be physically located by the site. Therefore it is possible, from any location with a computer and the system to mark a location on the map, record information about that location, and receive analysis on that location from the system and method of the present invention.

Site Information Form 300

Figure 3:
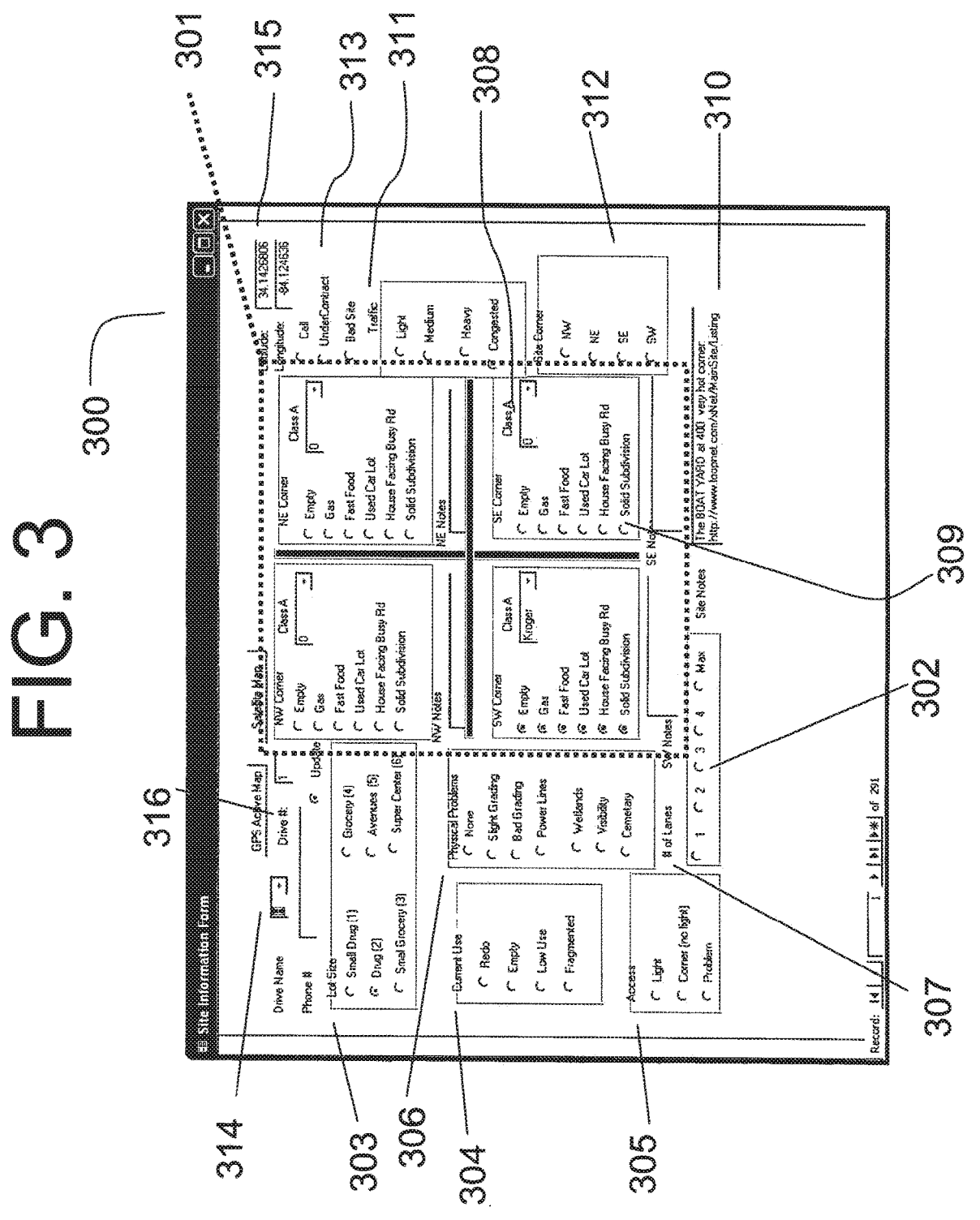

Referring now to FIG. 3, The Site Information Form 300 enables the user to quickly enter all relevant information about a site in a simple to use form. This method ensures that data collection is accurate, complete, and efficiently saved in the database. One aspect of the Site Information Form 300 is a touch screen interface that enables the user to quickly input site information. The Site Information Form contains a number of fields that are relevant to analyzing and researching a potential commercial real estate site. These fields are arranged to facilitate quick entry. Since most of the fields are predefined, only a checkbox or radio button selection 302 is required rather than freeform words entered by the user. This method also allows the database to more easily perform analysis on the information entered into the fields. These fields include the potential developable lot size 303. Another exemplary embodiment lists the lot size 303 by the acreage required by different tenants including a small drug store, a large drug store, a small grocery store, a large grocery store, a specialty retail center, and a supercenter 303. Another field on the Site Information Form 300 allows the user to select the current use of the site 304—whether it is a redevelopment to potentially buy the center and change the tenants or building footprint, whether the site is empty in raw land form, whether the site is low use, i.e., not the best and highest use, and, whether the site is fragmented, meaning it has many owners. Another field allows the user to select access issues 305 such as whether there is a traffic light—since many retailers require this; whether the site is on a corner with no light; and whether there is a problem with access to the site. Another field lists any physical problems 306 with the site such as a grading problem, the presence of power lines, the presence of wetlands or streams, site visibility from the road, and the presence of a cemetery on the site. Another field 307 prompts the user to list the size of the road in front of the site in order to determine capacity, which shows the number of lanes. Additionally, the user can record 301 the other uses on the adjacent and opposite corners of the intersection in order to record the competition's location and alternative site location possibilities. The layout of this section is unique because it is organized like a standard intersection 301 with areas for the user to input the use on each corner. For each corner, the user may choose to input from the following options: whether there is a major class A retail tenant and if so, the user selects the tenant from a list 308; whether there is a gas station, a fast food restaurant, a used car lot; a house facing a busy road which would indicate a competing site; and, a solid subdivision which would indicate no competing use could occupy the other corner 309. Normally, the Site Information Form 300 orients the intersection layout in the following manner: the northwest corner on the upper left part of the interface, the southwest corner below it, the northeast corner on the upper right side of the interface, and the southeast corner below it. An alternative exemplary embodiment to this layout rotates the orientation of the layout as the direction of the vehicle changes. For example, when the vehicle is facing north, the northwest corner will be on the left side of the interface and the northeast corner will be on the right. But when the vehicle is facing south, the southeast corner of the intersection will be on the upper left side of the interface and the southwest corner will be on the upper right side of the interface. The direction will change similarly for an east or west heading. Thus, the heading of the vehicle matches the heading of the intersection layout section of the Site Information Form 300. This method ensures that the user correctly matches the use of each corner to its correct field on the interface. This method is possible by retrieving the vehicle's heading from a GPS reading and the GPS trail information 202 from the GPS Active Map 200. The Site Information Form 300 also allows the user to record special notes 310 about the site, the level of traffic 311 at the site which is inputted manually by the user or derived automatically from traffic counts, on which corner the site is located 312, the call history on the site 310, the site's priority, the name of the site 314, the latitude and longitude of the site 315, and the drive 316 on which the site was located, which is a time and location stamp of where and when the site was located.

Drive Application Satellite Map 400

Figure 4:
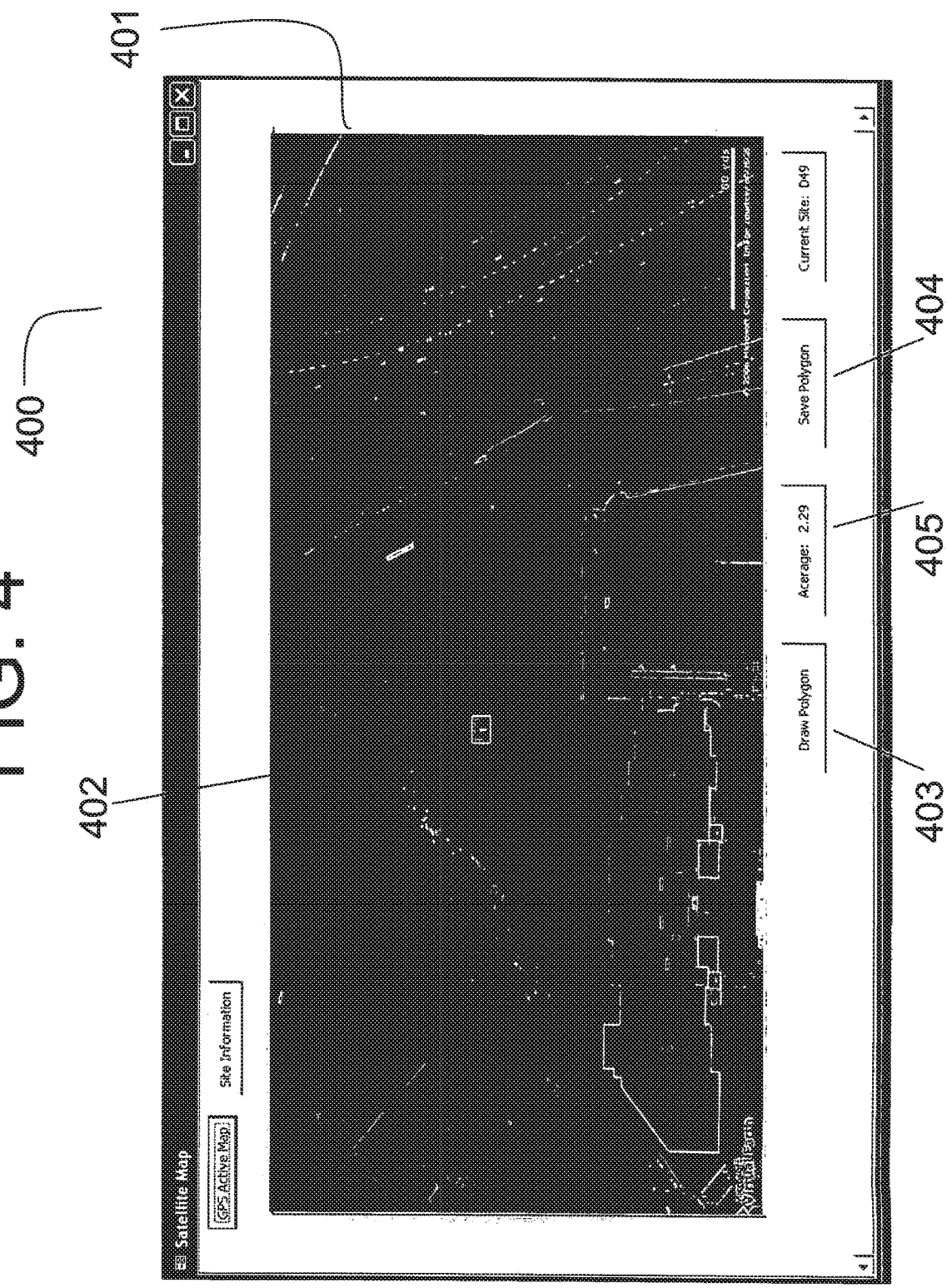
FIG. 4 shows an exemplary data display illustrating an exemplary embodiment of an interface displaying satellite imagery of a real estate site and options to record information about a real estate site.

Referring now to FIG. 4, a satellite map 400 is important to the recording of information in the field because it allows the user to see some details or layout aspects of the site that are not visible from the road. The satellite images may reside on the computer or be accessible via the internet which is accessed via a wireless or cellular internet connection in the vehicle. When the user opens the satellite map 400 the map 400 reads the location from the GPS device or GPS Active Map 200 and automatically zooms the satellite view 401 to the location of the site that has been marked 402, or the current vehicle position 201. The user has the ability to draw a polygon 403 around the site and save the polygon 404 to the database for future use. The system calculates the square footage area 405 of the site based on the coordinates of the polygon and saves this value to the database. This value can later be used to perform analysis and select sites that meet certain acreage requirements.

Geospatial Variable Selector Interface 500

Figure 5:
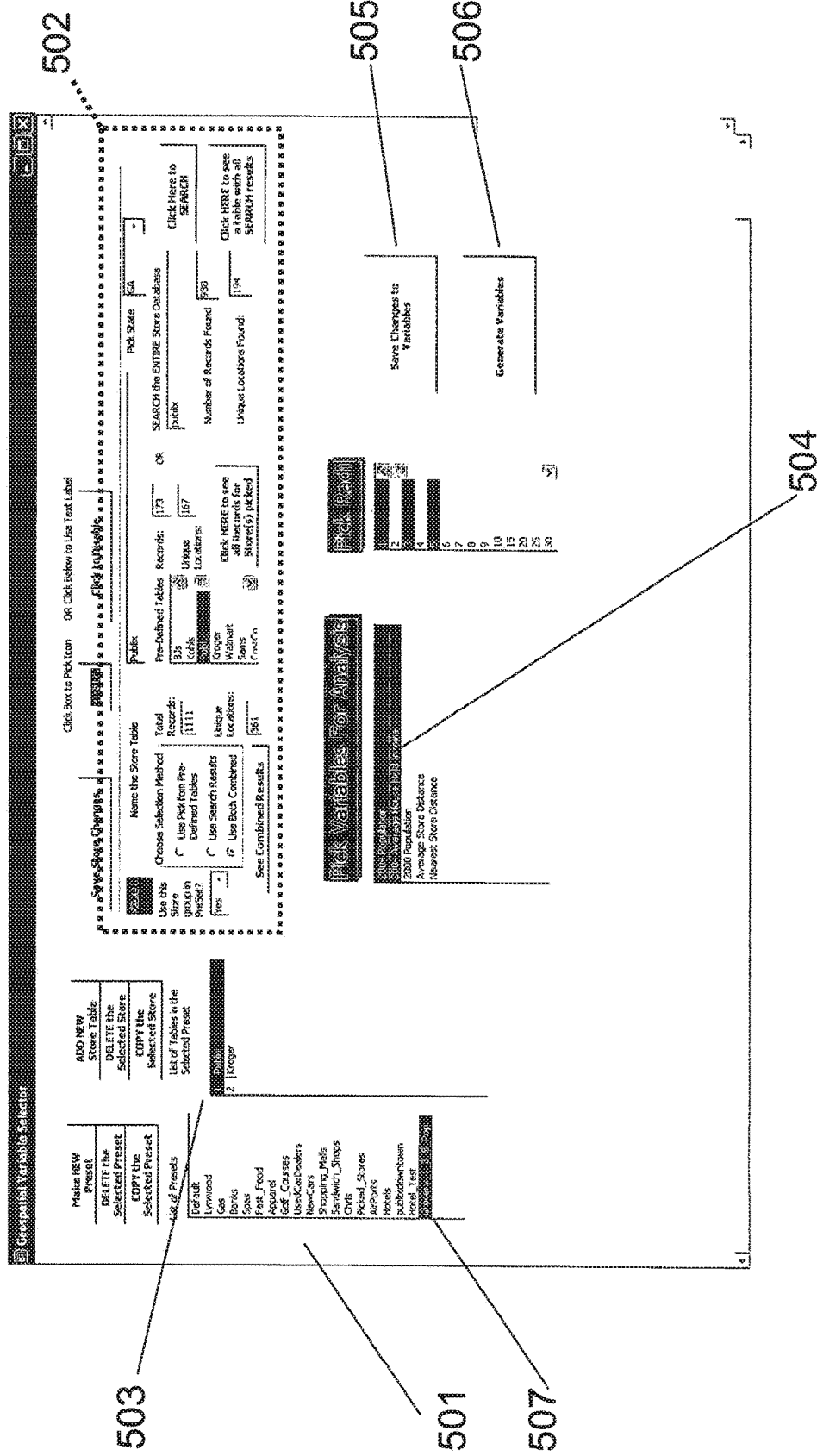
FIG. 5 shows an exemplary data display illustrating an exemplary embodiment of an interface to generate information and data used in the overall system architecture.

Referring now to FIG. 5, an exemplary embodiment of the present invention provides a user method to select geospatial variables to analyze. The Geospatial Variable Selector Interface 500 is a first step to identify a retailer's required demographic and location criteria for a site. This exemplary embodiment is described in a commercial real estate context but may be used in other exemplary embodiments as well. The user may employ the Geospatial Variable Selector Interface 500 to analyze relationships between sites recorded using the drive application 154 or sites selected off a map 200, and geospatial variables 504. Geospatial variables include demographic information and other sites and retail locations. The system and method can help the user identify locations to which the user should drive to get more detailed notes on a potential site that meets the criteria of the targeted retailers.

The user is presented with a form on a visual display 500 and is able to select a geocoded object(s) 502 on which to run an analysis. A geocoded object in a commercial real estate context would be a site location or an existing retail, industrial, or office location or groups of locations. The user may obtain objects from a list or search interface 502. The user then chooses the analysis to run from the analysis section 504 of Geospatial Variable Selector Interface 500. Analysis options include but are not limited to, distance relationships between selected geocoded objects, demographic data related to geocoded objects, and statistical relationships. Examples of analysis options in a commercial real estate context include: 1, 3, and 5 mile population; 1, 3, and 5 mile household income; and a 1, 3, and 5 mile household postal drop count analysis. The methods for calculating these analyses are described below under the headings Average Retailer Distance 900 and Average Retailer Demographics 1200. Groups of pre-defined geocoded objects and analyses may be preset 501 so the user can quickly choose an analysis package to run. For example, the user could create a preset called "Grocery Stores and 1, 3, 5 mile Population" 507 and then choose retailers to analyze from the list or from a search 502. For the purposes of this example let's assume that the user selects Publix and Kroger 503, two grocery store chains in business at the time of this writing, from a predetermined list of retailers. After choosing the retailers, the user would select the analysis to be performed from the analysis list 504. In this case, the user selects the 1 Mile Population, 3 Mile Population, and 5 Mile Population analyses to be performed. The user saves the setup 505 and instructs the system to perform the calculations that correspond to the locations and analyses chosen 506. If the user desires he can now create a separate preset called "Grocery Stores and 10 Mile Population" having a variety of geocoded store objects and analyses saved as presets to be run. This saves time for the user because presets can be quickly changed in the field, whereas generating a preset takes more time. Other uses of presets would be evident to one skilled in the art.

Commercial Real Estate Analysis Interface 600

Figure 6A:
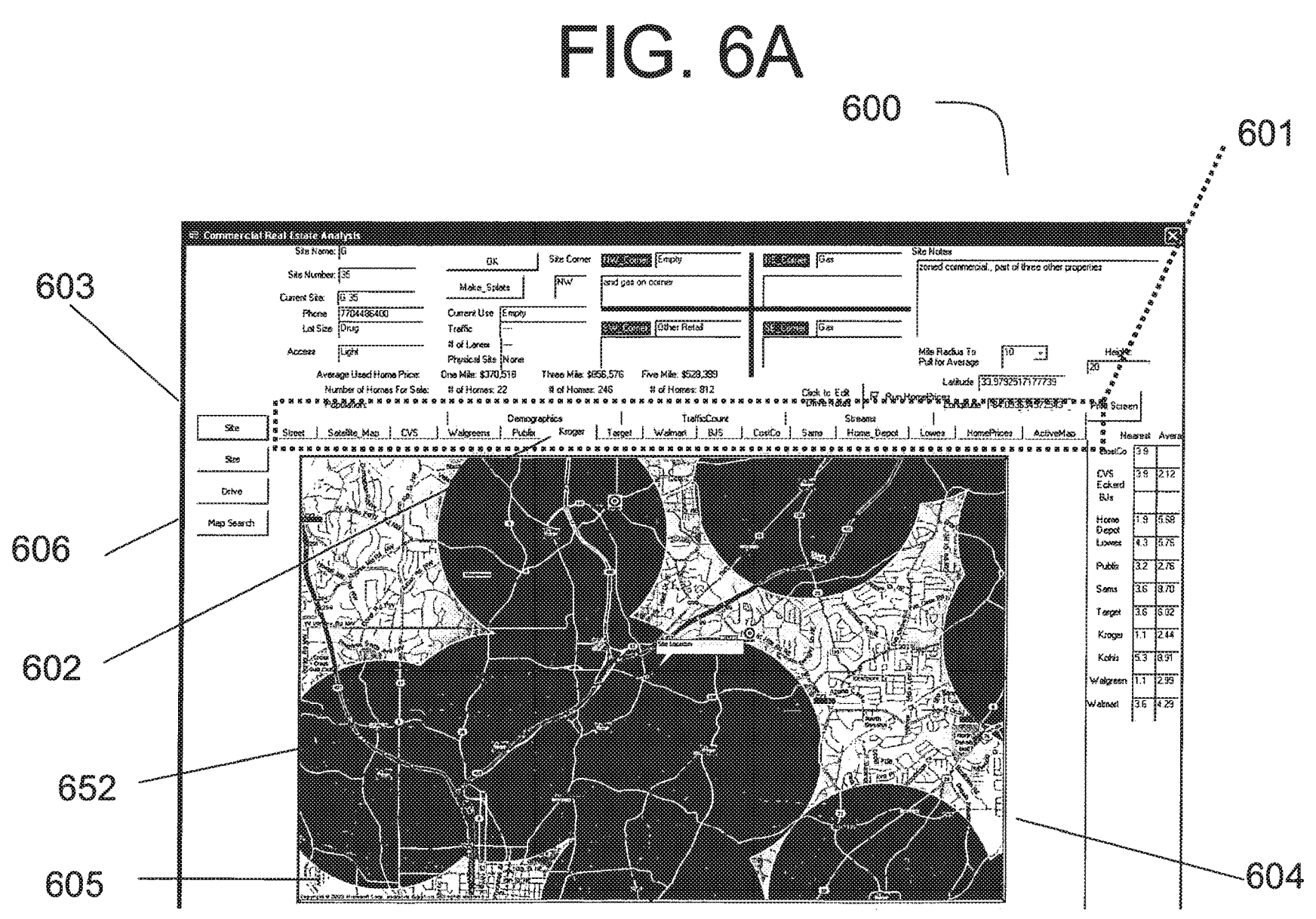
Figure 6B:
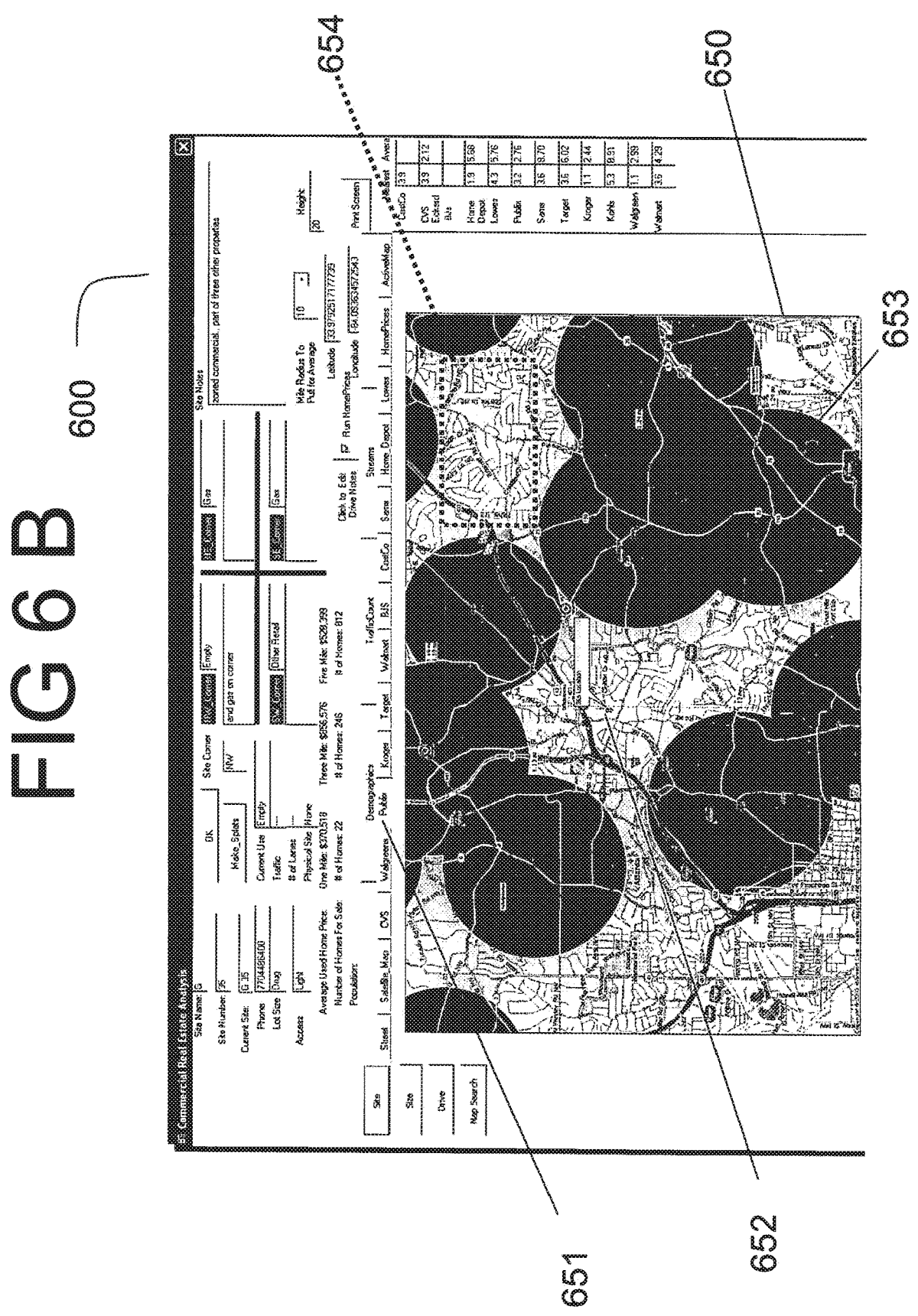

Referring now to FIGS. 5, 6A, and 6B, once the user has selected a preset 501, the user opens the Commercial Real Estate Analysis Interface 600. The content of this interface 601 is automatically generated based on the user's preset choice 501. For example, if the preset 501 contains two stores 503 for location analysis, the tab section of the real estate analysis interface 601 will include two tabs, one for each store. In a further aspect of this exemplary embodiment, the user may select from a list those stores and variables which should be displayed in the real estate analysis interface 600. These selections will populate on the interface tabs 601.

There are several advantages of using a tabbed interface 601 to analyze maps and information. A tabbed analysis interface 601 provides the ability to quickly scan through tabs at the same height. The tabs can include maps 604, each zoomed to the same location and height for a real estate object being analyzed. This allows the user to quickly scan between tabs 601 and understand the information presented on top of the map 604. The result, the user does not have to reprocess the background map 604 in his mind (which doesn't change); rather, he can focus on the data being presented.

A benefit of the tabbed interface is explained in the following example. The user has several retailer trade area maps loaded with store locations and a colored radius shape around each store. One tab 602 will include a map 604 of retailer #1 and have a radius drawn around each of retailer #1's stores 605. The next tab 651 will include a map 650 of retailer #2 and have a radius drawn around each of retailer #2's stores 653. Each map is centered on the same point 652, in this instance, the potential site location 652 for one of the 2 retailers. The user can scan through the tabs 601 by clicking on each, and by focusing his eyes on the site location 652 can see whether one of the colored radii 653 from each retailer overlaps the location of the site 652. If the user sees a map 650 with no overlapping retailer radius he can conclude that the location may be a good location for that particular retailer 651. Areas of the map with no colored shapes are referred to as holes 654. A user will often plan a site selection drive by opening a map 650 of retailer circles 653, finding the holes 654 and plotting a route that allows her to scout for properties in each of these holes. This method significantly reduces the time spent scouting for sites 652, because the site selector knows exactly where to go.

A further exemplary embodiment of The Commercial Real Estate Analysis Interface provides the user with analysis search options 603 including: searching by site, searching by size, searching by drive, and searching by map selection 606. The user may also choose an analysis 606 from a location picked on an interactive map. The user can select the background interactive map 604. For example, the user could choose a particular trade area map, actual land use map, or traffic map, or any combination of the foregoing, as a background map 604. The user may then map data on top of this background information. The user may interact with these maps, save the maps, and retrieve the maps for further analysis In one exemplary embodiment of The Commercial Real Estate Analysis Interface 600, the user can create background maps 604 with circles or shapes around locations. In a commercial real estate context, circles and shapes can be drawn around retail locations using the Average Distance Trade Area method 1000 or the Average Demographic Trade Area method 1300. The user benefits from these methods when looking at a map since a user can look for holes 654 which are not shaded by a retailer's radius 653 and know that a retail location may be able to go there. For example, the user chooses the site on the map 650, and runs an analysis. The Application Processes 150 draw circles around the retail locations and shades the circles a solid color. The user can also manually determine the size of the circles 653 around each retailer. For instance, the user may want to see a map 650 where the circles 653 around grocery stores have a radius of 2 miles, and another map which shows the radius around drug stores as 1 mile. The radius can also be determined by using Average Distance Trade Area method 1000. In this exemplary embodiment, the circles shown to the user on a map will have a radius equal to half the average distance between the stores. Each retailer will therefore have a custom radius size 653 based on the average distance 1009 between it's stores in a given area specified by the user for analysis 1006. The radius may also be determined by the average demographic variable function described under Average Demographic Trade Area method 1300. In this exemplary embodiment, the circles 653 will encompass an area which meets the average demographic variable. For example, in a given area specified by the user, a retailer may have an average 3 mile population of 20,000. The program will draw circles around each of the retailer's stores until size of the circle encompasses an area which has a population of 20,000. In some cases, it may not take a very large circle to encompass 20,000 people, and therefore two stores may be able to go in a high population density area and have circles that do not overlap each other.

Figure 7:
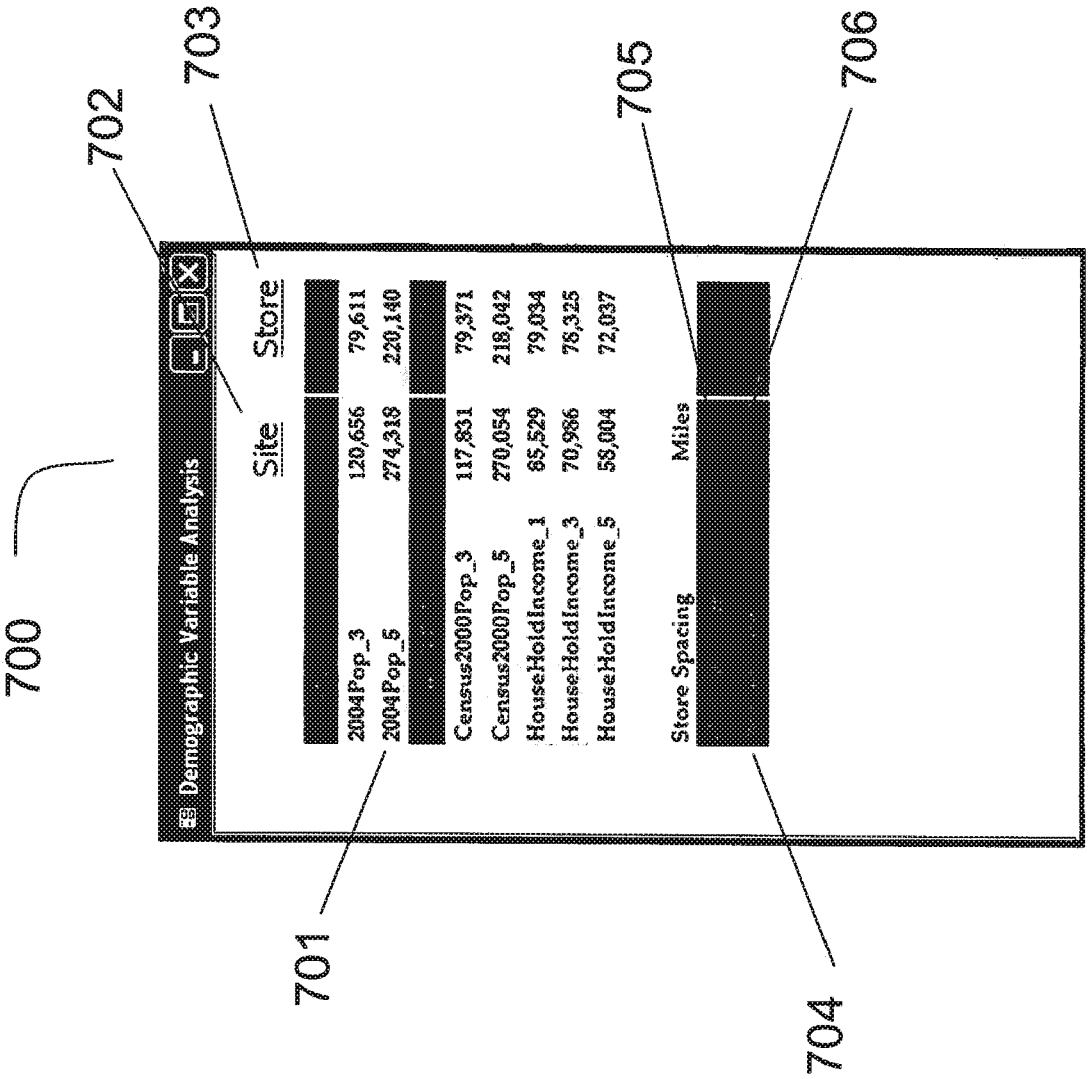
FIG. 7 shows an exemplary data display illustrating an exemplary embodiment of an interface used to display demographic and geospatial variable comparisons.

Referring now to FIG. 7, a further exemplary embodiment 700 of The Commercial Real Estate Analysis Interface 600 displays the geospatial variable analyses selected by the user 701. These include but are not limited to: the site demographics 702, the average retailer demographics 703, and the average retailer distance 704. The methods that generate the displayed information 700 are described below. One exemplary embodiment 700 compares the site's demographics 702 to the average retailer demographics 703, and the site's distance to the nearest retailer 705 to the average retailer distance 706. The result is displayed in a format that the user can easily discern which retailers will work best for the site, and which retailers are ill-suited for the site. One exemplary embodiment 700 may use color shading to represent whether the site's demographics 702 and specified variables 701 meet the average store demographics 703 and variables 701 in the area. If the values for site's demographic variable values 702 meet or exceed the average demographic variable values 703 for a particular retail store in the area, then the color of the row in the table will be shaded green. If the site's demographic variable value 702 falls below the retailer value 703, then a color of yellow or red will be assigned to the row to visually warn the user that the site value 702 does not meet the average store requirements 703 in that area. Alternatively, color coding can use statistical methods such as standard deviation to assign colors to the cells.

Referring now to FIG. 8, another exemplary embodiment 800 to display geospatial variables analysis uses color coding and sorting to make conclusions about the data easy to understand 800. The analysis 800 is displayed to the user in a table format. In a commercial real estate context, this method can help the site selector find a tenant. This method ranks the tenants in order of how well the site meets their demographic requirements. The columns 801 represent the demographic variables used to calculate the average retailer demographics 1200. The rows represent each retail store analyzed 802. Each cell in the table contains the value of the variable for the respective retail store 803. These values 803 are the demographic requirements of the retailer 804 for the particular variable value 801. If the values 807 for site's demographic variable values 807 meet or exceed the average demographic variable values for a particular retail store in the area, then the color of the cell for the retailer value in the table will be shaded green 808. If the site's demographic variable value falls below the retailer value, then a color of yellow or red will be assigned to visually warn the user that the site does not meet the average store requirements in that area. Alternatively, color coding can use statistical methods such as standard deviation to assign colors to the cells. In addition to assigning colors to the cells, the table will also be sorted so that the retailer 804 whose demographic and distance requirements the site meets, will be at the top of the list, and the retailer whose demographic and distance requirements the site does not meet, will be at the bottom 805. Thus, the user will see a table with green cells at the top and yellow and red cells at the bottom. The table also sorts and shades cells based on the closest existing retail store location and the average distance between that retailer's stores 806.

Average Retailer Distance Method 900

Figure 9:
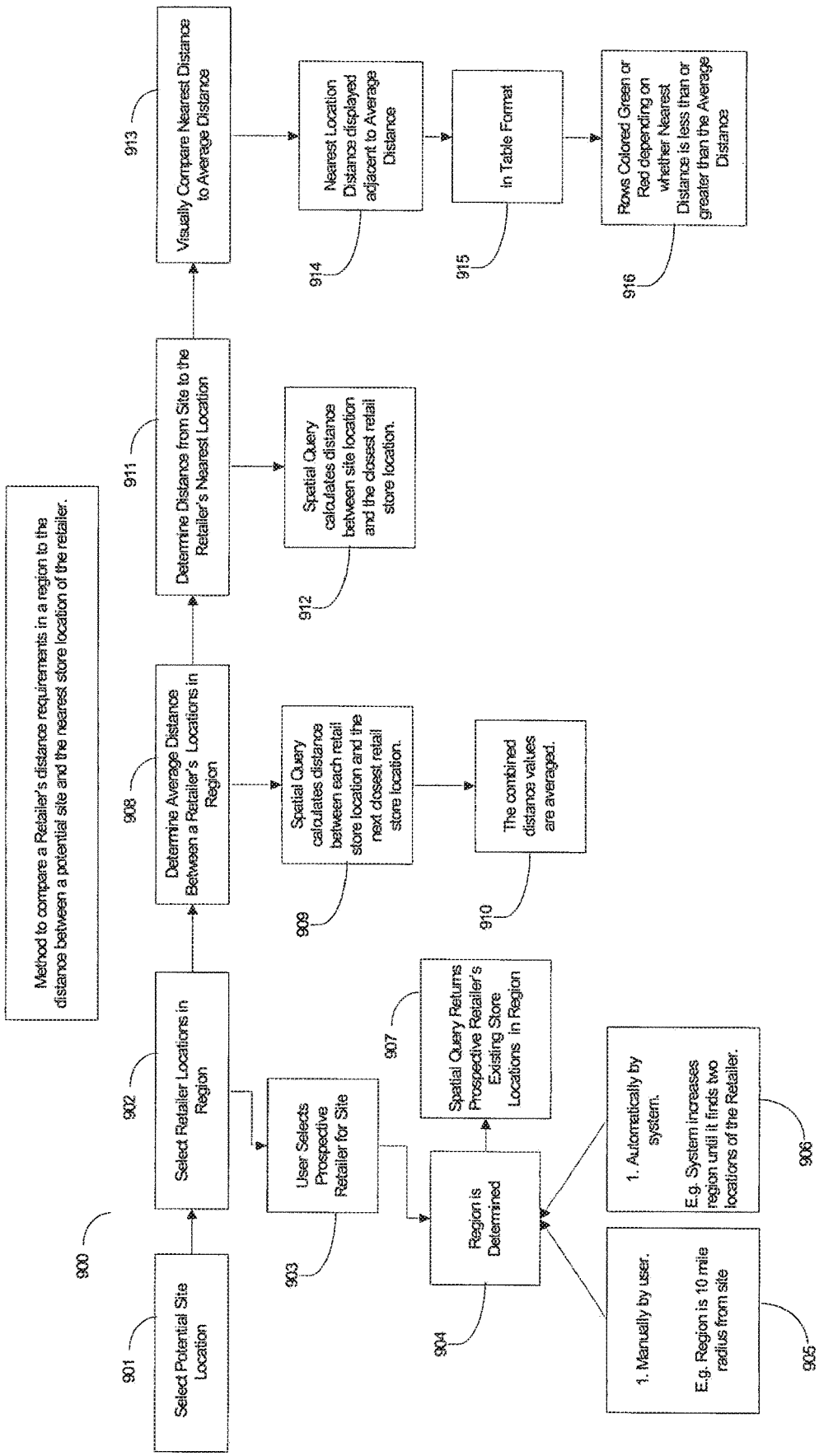
FIG. 9 shows a flowchart of a method illustrating an exemplary embodiment to compare a retailer's distance requirements in a region to the distance between a potential real estate site and the nearest store location of the retailer.

This method 900 illustrated in the flowchart of FIG. 9, returns the average distance between geocoded objects in a given area. Described in, but not limited to a commercial real estate context, this method 900 returns the average distance 908 between stores of a particular retailer in a given area 904. This distance value 908 is useful to determine the necessary minimum distance between a potential commercial real estate site and the closest existing retail store location 911. Most retailers do not want to put their store locations too close together because overlapping trade areas reduce each store location's potential profit. Many retailers have their own internal criteria for determining how close the stores should be placed together. Using this method 900, the user can understand each retailer's minimum distance requirements for a given region 904.

The method 900 illustrated in the flowchart in FIG. 9 describes the method 900 to compare a retailer's requirement of minimum distance between store locations 908 in a region 904 to the distance between a potential site location and the nearest store location 911. A user selects a potential site location 901, and a prospective retailer 903 to compare.

Minimum distance requirements for a retailer may vary from region to region so the region size 904 to compare distances may be selected manually by the user 905, or automatically by the application 906. A spatial query returns the prospective retailer's existing store locations in the selected region 907. Another spatial query calculates the distance between each of the retailer's store locations and the next closest store location 909. These distance values are totaled and averaged 910 resulting in a value that is the average distance between a retailer's locations in the region 908. The next step in the method 900 is to determine the distance from the potential commercial real estate site location to the nearest location of the retailer 911. A spatial query makes this calculation 912. The next step 913 is to visually compare the nearest distance 911 to the average distance 908. The nearest location distance 911 may be displayed adjacent to the average distance 914 in a table format 915. The rows may be colored a color such as green or red depending on whether the nearest distance is less than or greater than the average distance 916. Colors are useful to allow the commercial real estate site selector or user determine whether the distance values exceed or fall short without having to look at and mentally process the actual number.

Average Distance Trade Area Method 1000

Figure 10:
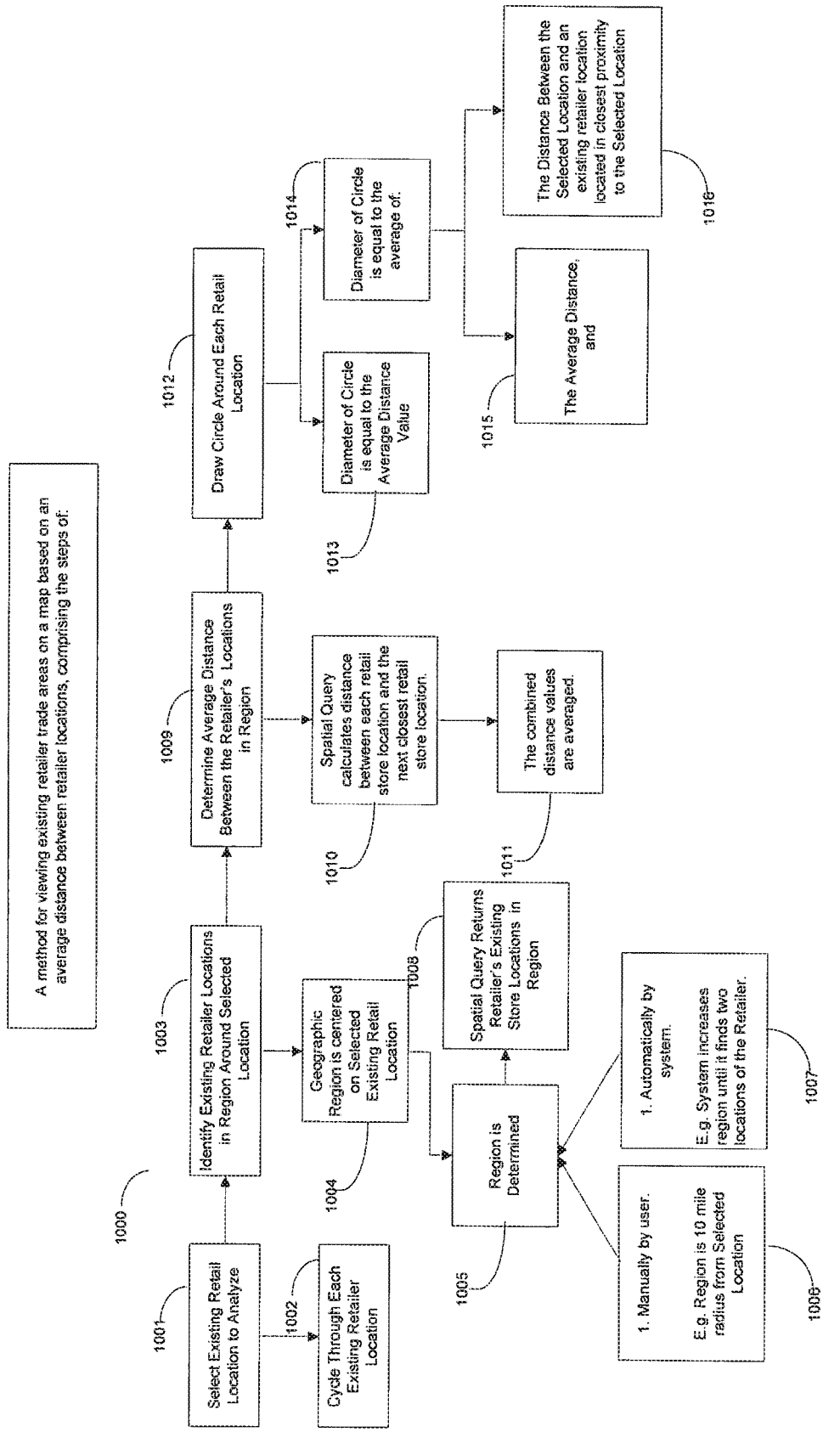
FIG. 10 shows a flowchart of a method illustrating an exemplary embodiment for viewing existing retailer trade areas on a map based on an average distance between retailer locations.
Figure 11:
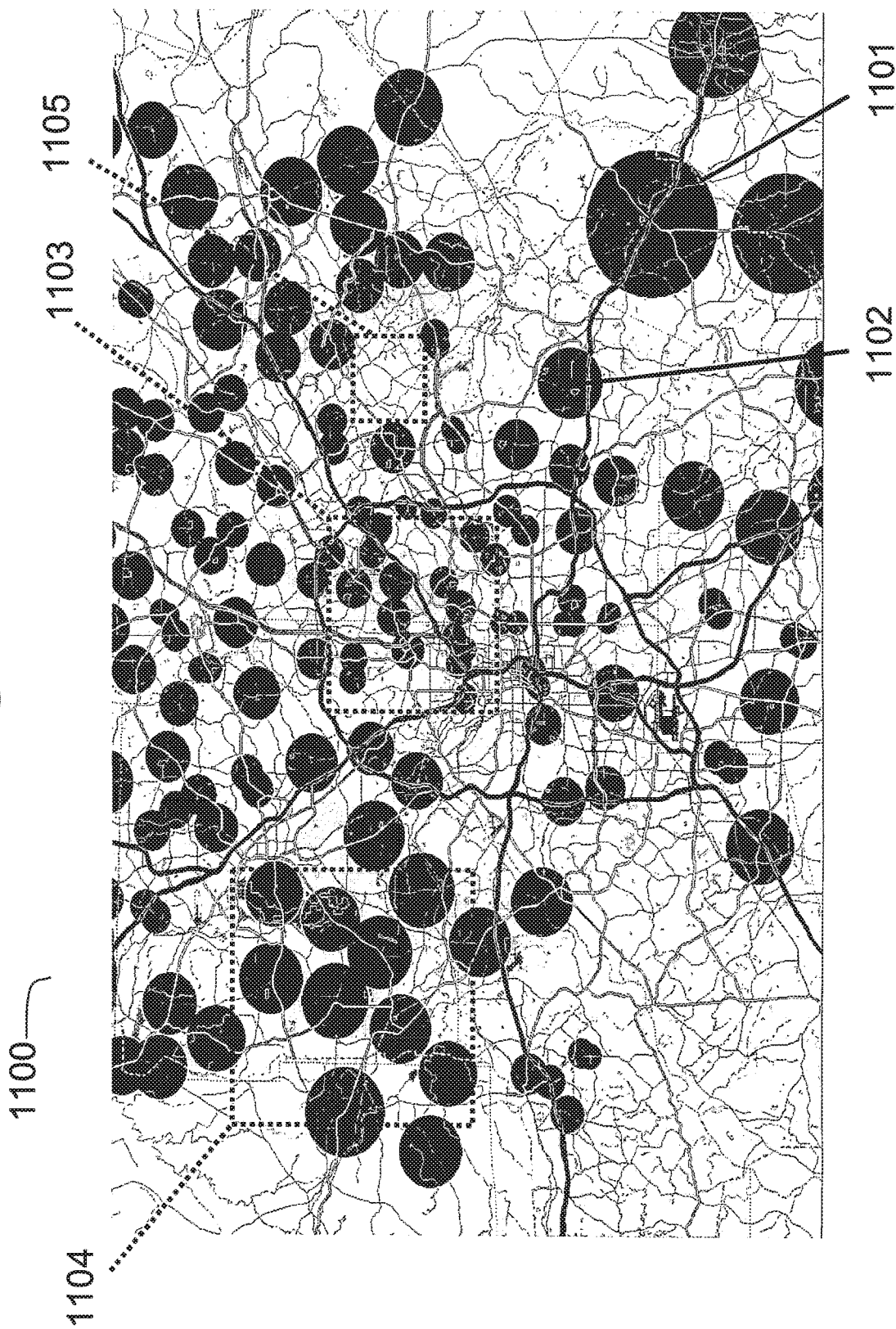
FIG. 11 shows an exemplary data display illustrating an exemplary embodiment of a map created by a method for viewing existing retailer trade areas.

Referring now to FIGS. 10 and 11, the method 1000 creates a map 1100 of an existing retailer locations' trade areas 1101 based on the average distance 1009 between the retailer's locations 1003. The user selects an existing retailer to analyze 1001 trade areas for each location, and the application 158 cycles through the method 1000 for each of the retailer's locations. The trade areas 1101 are based on the average distance 1009 between the retailer's locations in the region 1003. Minimum distance requirements for a retailer may vary from region to region so the region size 1005 to compare distances may be selected manually by the user 1006, or automatically by the application 1007. A spatial query returns the retailer's existing store locations in the selected region 1008. The geographic region is centered on the selected existing retail location 1004. Another spatial query calculates the distance between each of the retailer's store locations and the next closest store location 1010. These distance values are totaled and averaged 1011 resulting in a value that is the average distance between a retailer's locations in the region 1009. The next step in the method 1000 is to draw a circle around the selected retail location 1012. The diameter of the circle is sized equal to the average distance value 1013, and may also be sized by using the value 1014 obtained by averaging the average distance 1015, and the distance between the selected location and an existing retailer location located in closest proximity to the selected location 1016.

This method 1000 creates a map 1100 with circles 1101 centered on each of the retail locations 1101. In a dense urban area 1103, where store locations are close together, the circles around each location will be small because the average distance value 1009 is small, however in rural areas 1104, where store locations are spaced very far apart, the circles will be large because the average distance value 1009 is large. Circles 1101 may be viewed as trade areas. Areas with no circles 1105 may be treated as holes where the retailer needs to add a store location. This enables the commercial site selector to target these holes to look for sites for a retailer with no trade area coverage there. Shapes other than circles can also be used.

Average Retailer Demographics 1200

Figure 12:
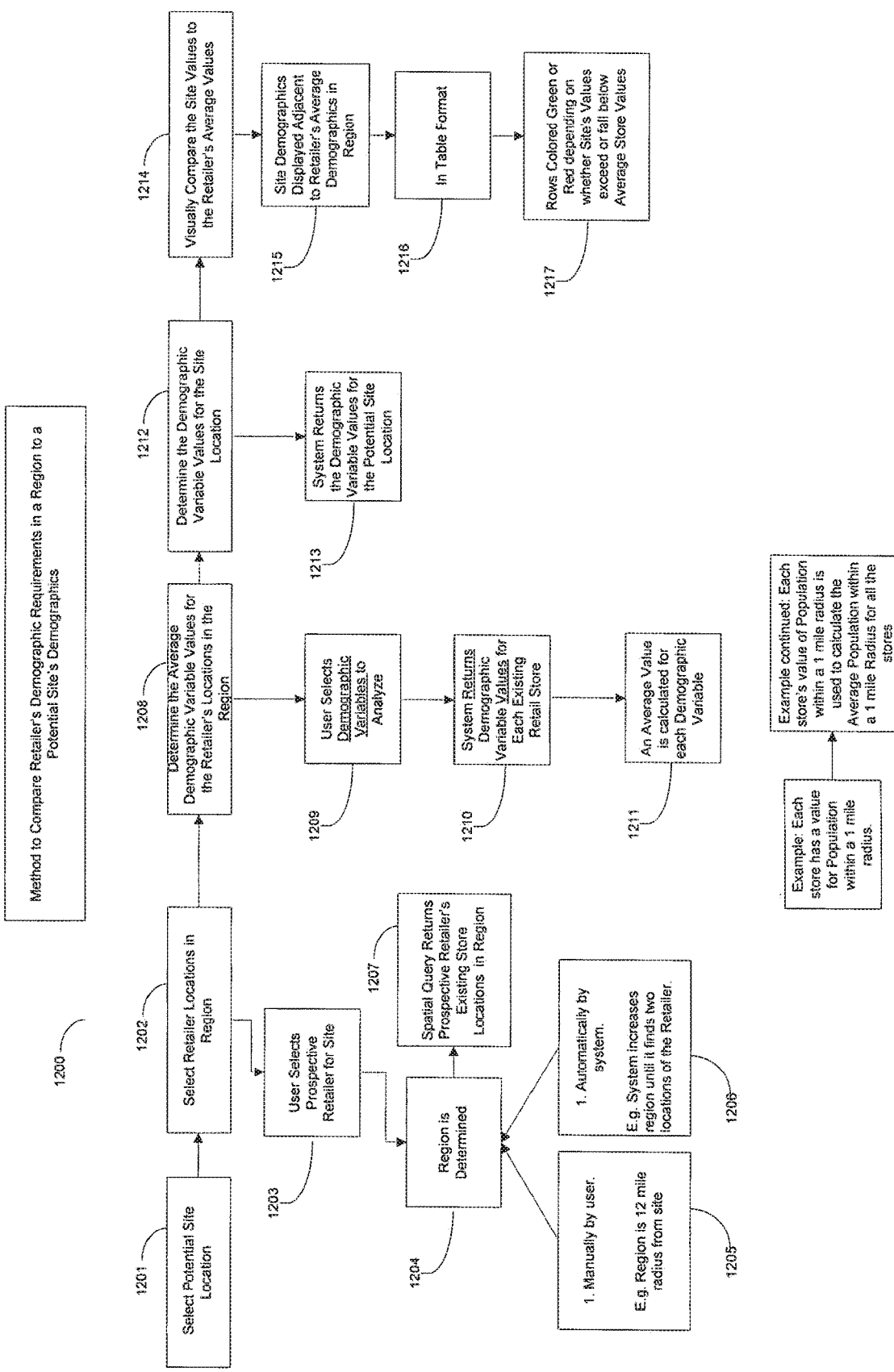
FIG. 12 shows a flowchart of a method illustrating an exemplary embodiment to compare a retailer's demographic requirements in a region to a potential site's demographics.

Described in, but not limited to a commercial real estate context, the method 1200 of FIG. 12 returns the average demographics of a group of stores of a particular retailer in a given area. This average value 1208 for each demographic variable is useful to determine the necessary demographic requirements of a retailer in a given area.

Sources of demographic variables 110 are used for this method 1200. Demographic variable information may be associated with and stored by a number of geographic areas including: census tract, census block, postal carrier routes, states, metropolitan service areas, and zip codes, states, counties, and regions. Many demographic variables may be returned as part of a demographic analysis. An example of three popular demographic variables in a commercial real estate context are population, number of households, and household income.

Most retailers do not want to put their stores too close together because overlapping trade areas reduce each store location's potential profit. Demographics can help define trade areas. Ideally, each retail store's trade area would pull from a population that does not overlap another of the retail store's trade area population. Each retailer may have its own internal criteria for determining the demographic requirements of its stores. Using this method, the user can understand each retailer's minimum demographic requirements for a given area.

The method 1200 of the flowchart in FIG. 12 describes the method 1200 to compare a retailer's demographic requirements in a region to a potential site's demographics. A user selects a potential site location 1201, and a prospective retailer 1203 to compare. Demographic requirements for a retailer may vary from region to region so the region size to compare demographics may be selected manually by the user 1205, or automatically by the application 1206. A spatial query returns the prospective retailer's existing store locations in the selected region 1207.

In order to determine the average demographic variable values for the retailer's locations in the selected region 1208, the user will first select which demographic variables to analyze 1209. An example demographic variable would be Total Population within a 1 mile radius. The application calculates and returns the demographic variable values for each of the existing retail store locations 1210. The values for each demographic variable are totaled and averaged 1211. An example expressed in a sentence: The average population within 3 miles of a CVS store is 20,000 people.

The next step is to calculate the same demographic variables for the site location 1212. Using a spatial query, the application returns the demographic variable values for the potential site location 1213.

Once both the average demographic variable values for the potential retailer 1208 and the site demographic variable 1212 values have been calculated, the two sets can be compared visually 1214. One method to effectively compare the two sets of values is to use a table format 1216 to display the site demographics adjacent to the retailer's average demographics in the region 1215. The method may use colors to enhance the visual effect; the rows may be colored green or red depending on whether the site's values exceed or fall below the average store values 1217.

An example of this method will now be described. First, the user selects a site location 1201 and a retailer 1203 to compare. Next, the user selects a region 1204 to analyze: for example, a 10 mile radius from the site. Next, the user selects a demographic variable 1209 to analyze: Population within 3 miles. Next, the method calculates the 3 mile population for each retail store location that lies within 10 miles from the site 1210. The method totals the 3 mile population values and calculates an average 1211. This average is The Average Retailer Demographics Value 1208. The Average Demographics value 1208 is then compared to the site's value 1212 for 3 mile population 1215. Thus, a user can determine whether the 3 mile population around the site 1212 exceeds, meets, or fails to match up to the average 3 mile population 1208 around the retailer's stores in the 10 mile region.

In a further exemplary embodiment of the Average Retailer Distance 900, and Average Retailer Demographics 1200 methods, both may be displayed to the user in the following format 700: in one column 702, the selected site's variables are displayed 702, and in the adjacent column, the retail store's average variables (i.e. the store's criteria) are displayed 703. Formats other than columns are evident to one skilled in the art. If the site's variables meet or exceed the average values in the store's column, the cell of the site's value will be shaded green. If the site's variables fall within one standard deviation below that of the store's criteria, the cell will be shaded yellow, and if the sites variables fall greater than one standard deviation below the store's criteria, then the cell will be shaded red. Other statistical methods or user specified ranges may be used to shade the cells. This display method allows the user to quickly see if the site's criteria meet or exceed that of the store's criteria. The user can look to see if the column is all green without having to look at the actual numerical values. If one of the cells is yellow or red, the user will know that the area's demographics or store selection criteria may not meet the demands of the particular retailer.

Average Demographic Trade Area Method 1300

Figure 13:
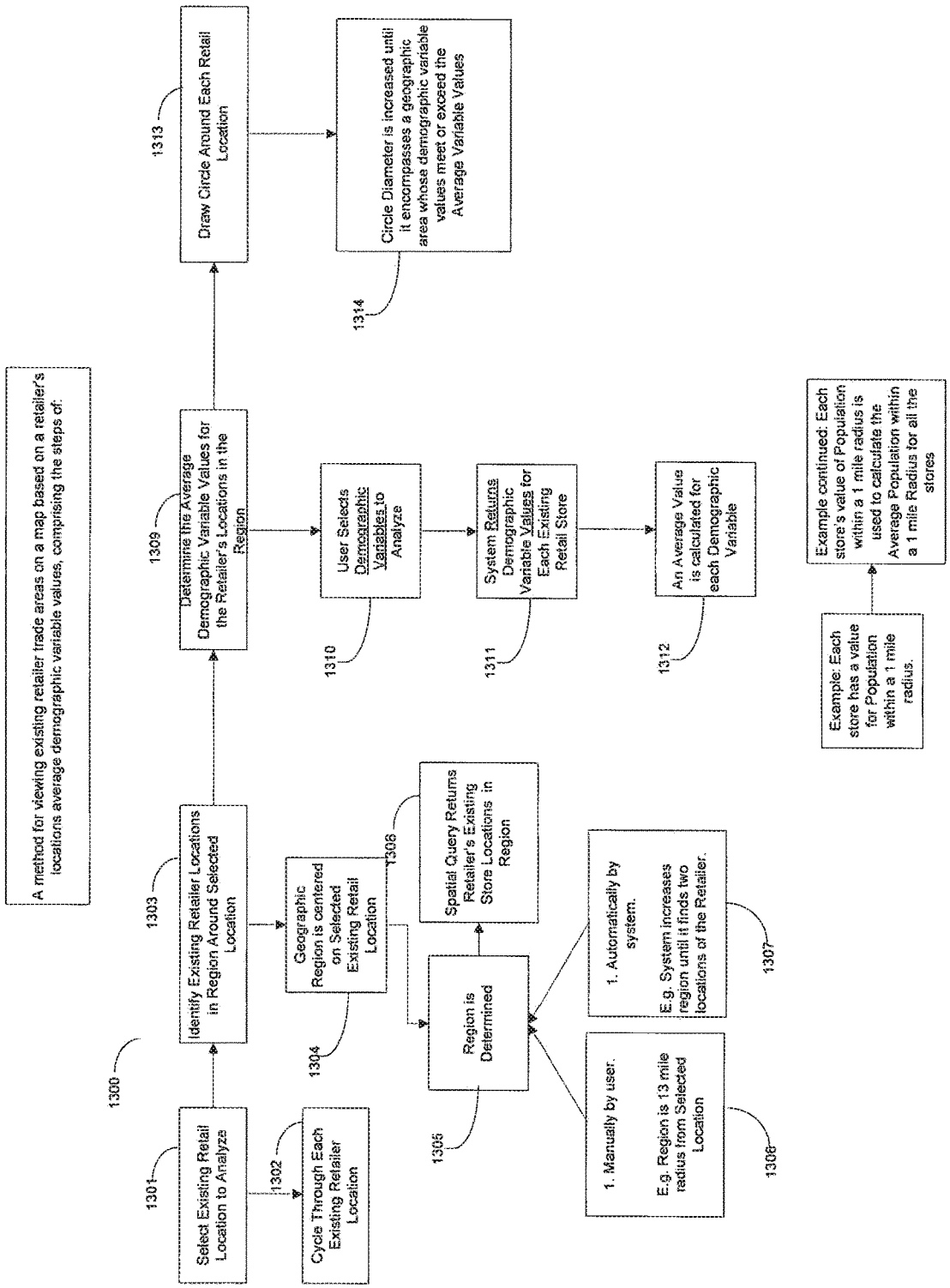
FIG. 13 shows a flowchart of a method illustrating an exemplary embodiment for viewing existing retailer trade areas on a map based on a retailer locations' average demographic variable values.

Referring now to the flowchart of FIG. 13, the method 1300 creates a map of an existing retailer locations' trade areas based on the average demographics 1309 among the retailer's locations 1303. The user selects an existing retailer to analyze 1301 trade areas for each location, and the application 158 cycles through the method 1300 for each of the retailer's locations. The trade areas are based on the average demographics 1309 among the retailer's locations in the region 1303. Minimum demographic requirements for a retailer may vary from region to region so the region size 1305 to compare demographics among locations may be selected manually by the user 1306, or automatically by the application 1307. A spatial query returns the retailer's existing store locations in the selected region 1308. The geographic region is centered on the selected existing retail location 1304. In order to determine the average demographic variable values for the retailer's locations in the selected region 1309, the user will first select which demographic variables to analyze 1310. An example demographic variable would be Total Population within a 1 mile radius. The application calculates and returns the demographic variable values for each of the existing retail store locations 1311. The values for each demographic variable are totaled and averaged 1312. An example expressed in a sentence: The average population within 3 miles of a CVS store is 20,000 people. The next step in the method 1300 is to draw a circle around the selected retail location 1313. The circle 1313, is sized by increasing the diameter until it encompasses a geographic area whose demographic variable values meet or exceed the average variable values 1314.

Home Price Icons

Figure 14:
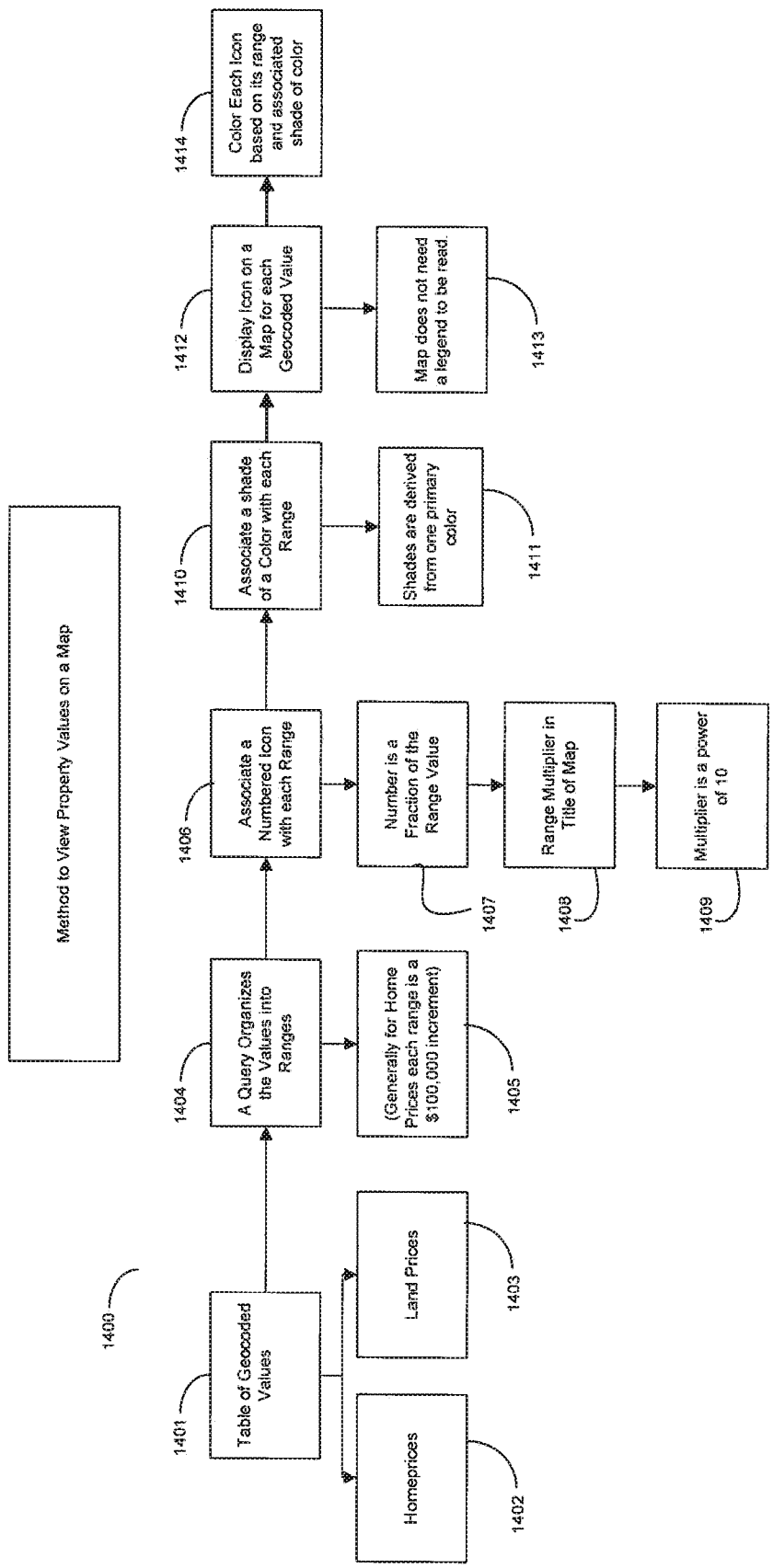
FIG. 14 shows a flowchart of a method illustrating an exemplary embodiment for viewing property values on a map.
Figure 15:
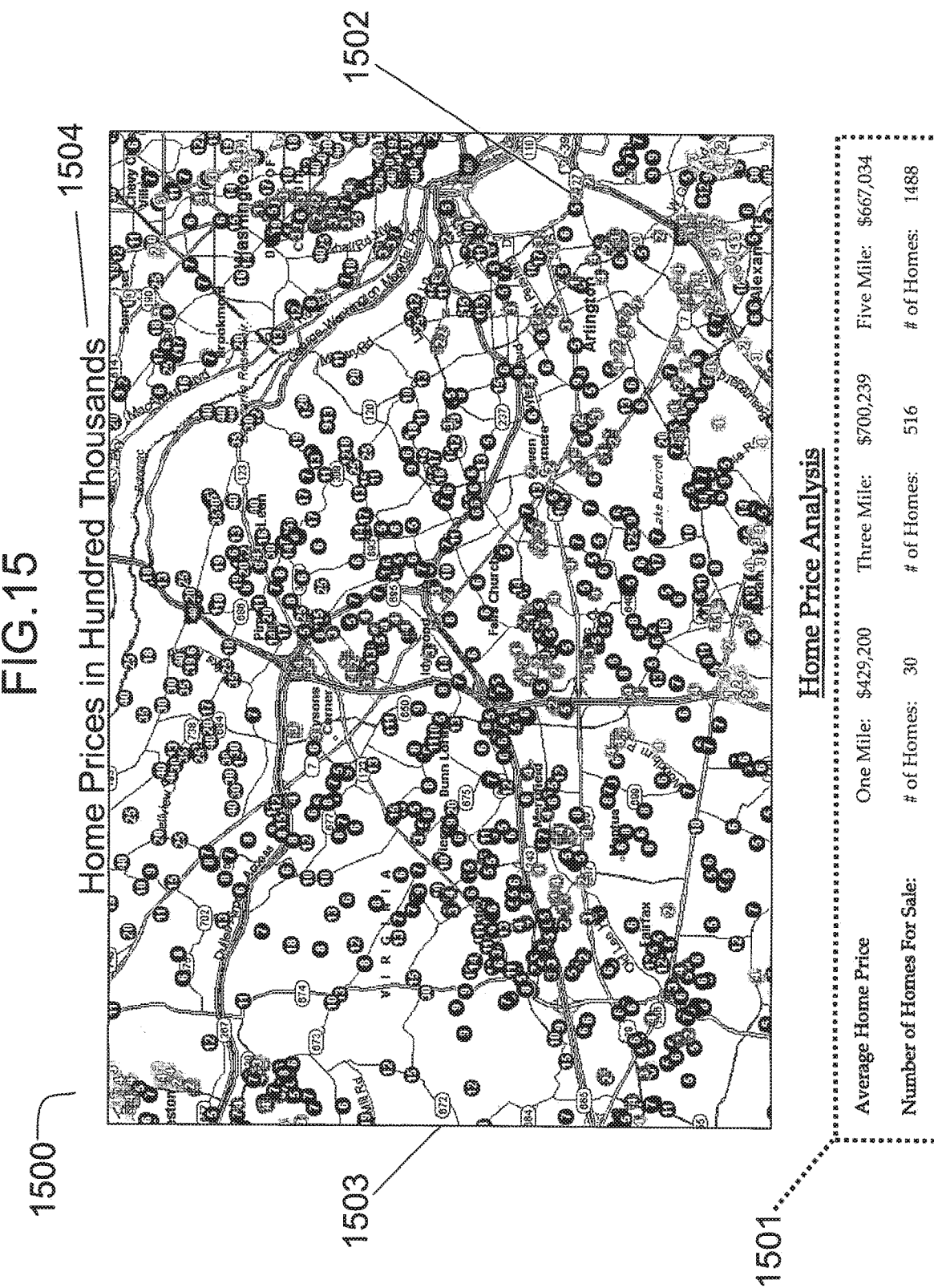
FIG. 15 shows an exemplary data display illustrating an exemplary embodiment of a map created by a method for viewing property values on a map.

Referring now to FIGS. 14 and 15, an additional exemplary embodiment of the present invention 100 displays Home Prices on a map. This method 1400 provides the user with a visual display 1500 of Home Prices represented by shaded icons with numbers on a map 1502. Unlike manifestations of prior art, the map 1503 does not require a key or legend 1413, because a price number is represented on the shaded icon 1502. The icons use shading from one primary color 1411 to indicate the price of the home relative to other home prices.

Referring now to the flowchart in FIG. 14 the method 1400 will now be described. Data on home prices 1402 is collected from several sources including: publicly available sources on the internet 122, purchased data 138, property deed records 128 and sources such as the Multiple Listing Service ("MLS") 136. The data on the home prices is stored in a table 1401 which includes a geocoded location of the home and a price value. Land Prices 1403 may be substituted for home prices 1402 in this method 1400. A query 1404 organizes the values 1401 into ranges. With respect to home price values 1402, an exemplary range may be defined in $100,000 increments. For example $100,000-$199,000. A numbered icon is associated with each range 1406. Following the previous example, the number on the icon would be 1. Therefore the number on the icon is a fraction of the range value 1407. The multiplier used to denote the range may be specified in the title of the map 1408. For example, the title of the map could read Home Prices in Hundred Thousands 1504. An icon with a 2 on it 1502, would therefore indicate that the home price was between $200,000 and $299,000. The next step in the method 1400 is to associate a shade 1410 of a single primary color 1411 with each range. The benefit of using a shades from a single primary color is that the user does not have to reference a legend to understand the relationship between color and price, instead, the relationship between price and color may be derived by simply looking at the map 1503. The next step in the method 1400 is to display an associated numbered icon 1406 on a map at the location of each geocoded value 1412. Each icon is then colored based on its range and associated shade of color.

The resulting map 1500 is displayed to the user. The shading of the icons allows the user to see patterns in home prices. For example, where the icon set uses a shade of the single primary color blue, a neighborhood where the home prices are in the $100,000 range will have several pushpins that are light blue in color, whereas a neighborhood with home prices in the $1,000,000 range, with have several pushpins that are dark blue in color. If the user sees a dark blue area of the map 1503, he can infer that the homes are expensive without having to focus on the actual price. If the user wants to know the price of the home however, he merely needs to look at the icon's number which represents the price of the home in the multiple specified in the title 1504. For example, a title may say "Home Prices in Hundred Thousands ($100,000) 1504. If an icon has the number 2 on it 1502, then the home price is in the $200,000-$299,999 range 1502. Other interpretations of the icon's number can be specified in the title. An important aspect of the icon's number is that the user can print the map in black and white and still understand the values, without the use of color.

This method 1400 also allows the user to find what are commonly referred to as gems in the rough—where a lightly shaded property is amongst a cluster of dark properties, there is a high possibility that the property may be undervalued. The method 1400 is also used to discern neighborhood types based on the shading. When looking at a zoomed out view of a map 1503 with many Home Prices 1502 on it, the user will see patterns of Home Prices that have similar shadings of color. For example, an area with dark shading will indicate that this neighborhood is very expensive, whereas an area with lots of light shading will indicate that the neighborhood is very inexpensive.

An additional aspect of this exemplary embodiment is to display an average area home price in a textual display 1501 that constantly updates as the user drives around in a vehicle. An example in a commercial real estate context would be where the site selector drives a car looking for property to acquire. The interface 162 displays or through an audio interface, shows the site selector the average Home Price for a 1, 3, and 5 mile radius from the site selector's current location 1501. As the vehicle moves, the Home Price numbers will change as the user passes different neighborhoods with different prices. This aspect of a moving update can also be used to display demographic information or other geospatial variable 404.

This method 1400 of viewing Home Price analysis can also enable the user to understand income and spending power in an area since the likelihood of greater income and spending power is correlated with more expensive homes, and the likelihood of lesser income and spending power is correlated with neighborhoods with less expensive home prices. This method 1400 can help a retailer decide, visually, whether the surrounding neighborhoods fit the income profile of their target customer. This method could also be used for a variety of other purposes, as one skilled in the art would appreciate. For example, a consumer application would allow consumers to find neighborhoods that fit their price range. Helping consumers understand where all of the different types of neighborhoods are would greatly minimize the need for the traditional residential real estate agent.

Actual Land Use Map

Figure 16:
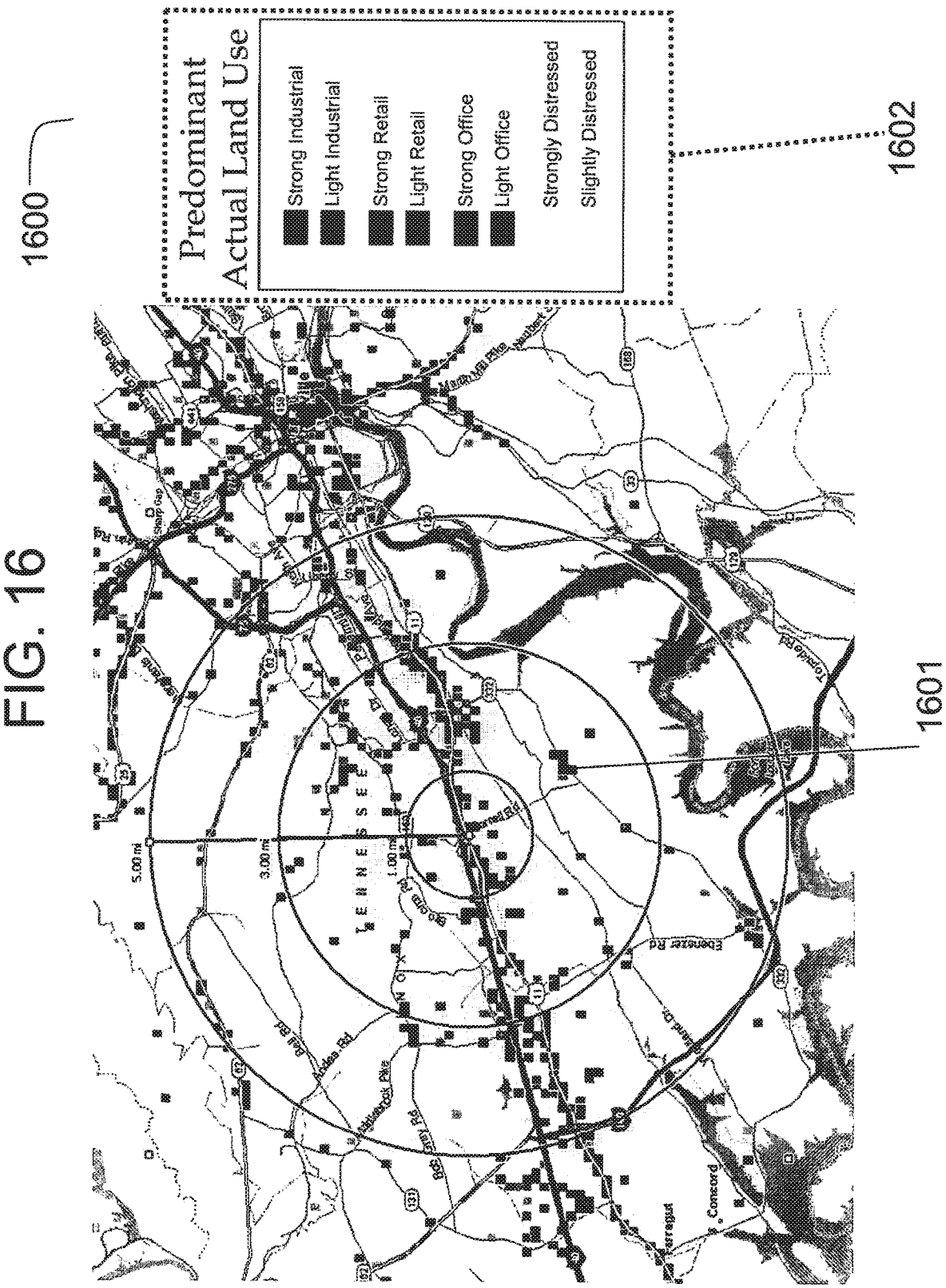
FIG. 16 shows an exemplary data display illustrating an exemplary embodiment of a map created by a method for coloring a map based on actual land use.
Figure 17A:
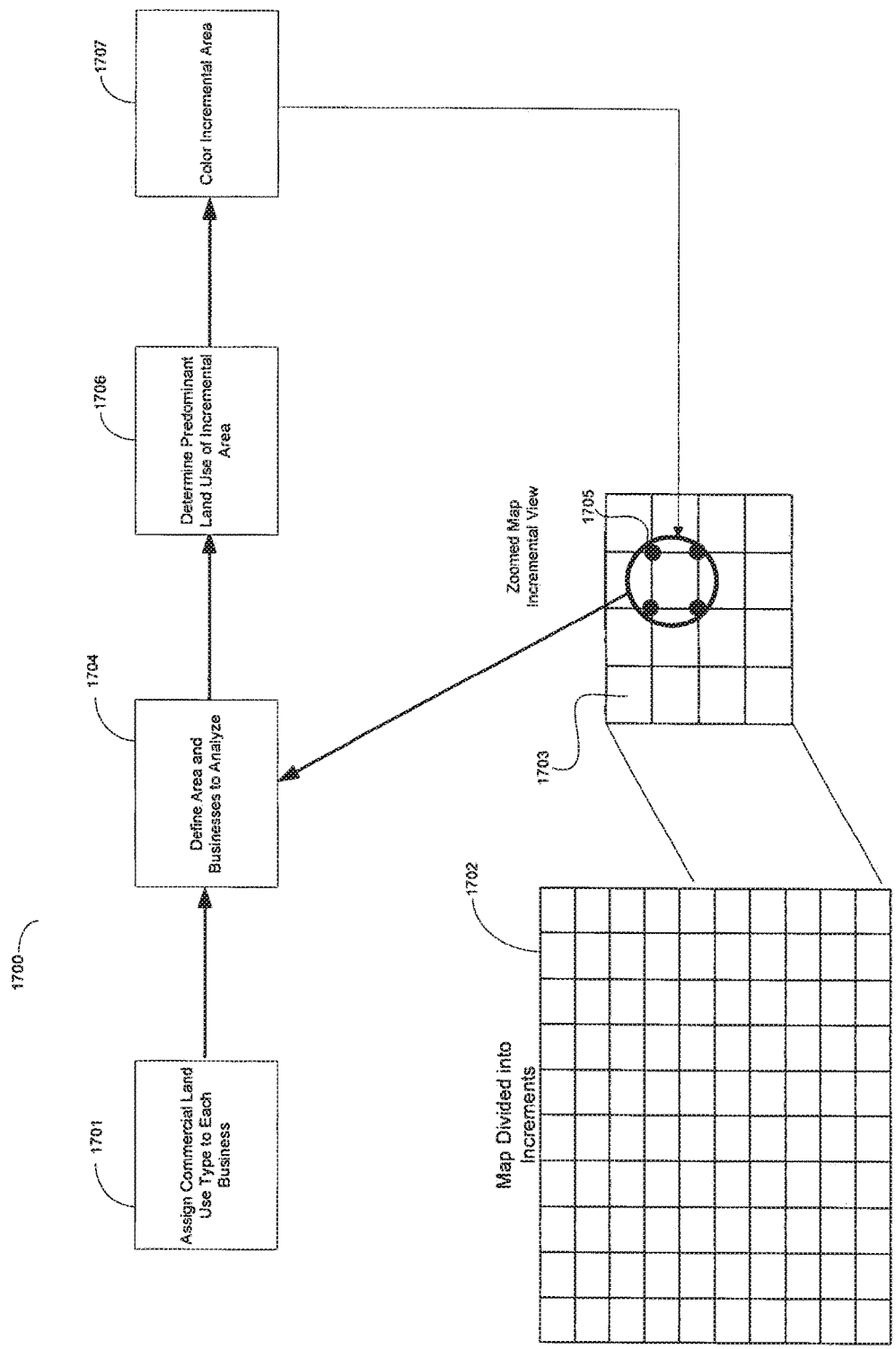
FIG. 17A shows a flowchart of a method illustrating an exemplary embodiment for coloring a map based on actual land use.
Figure 17B:
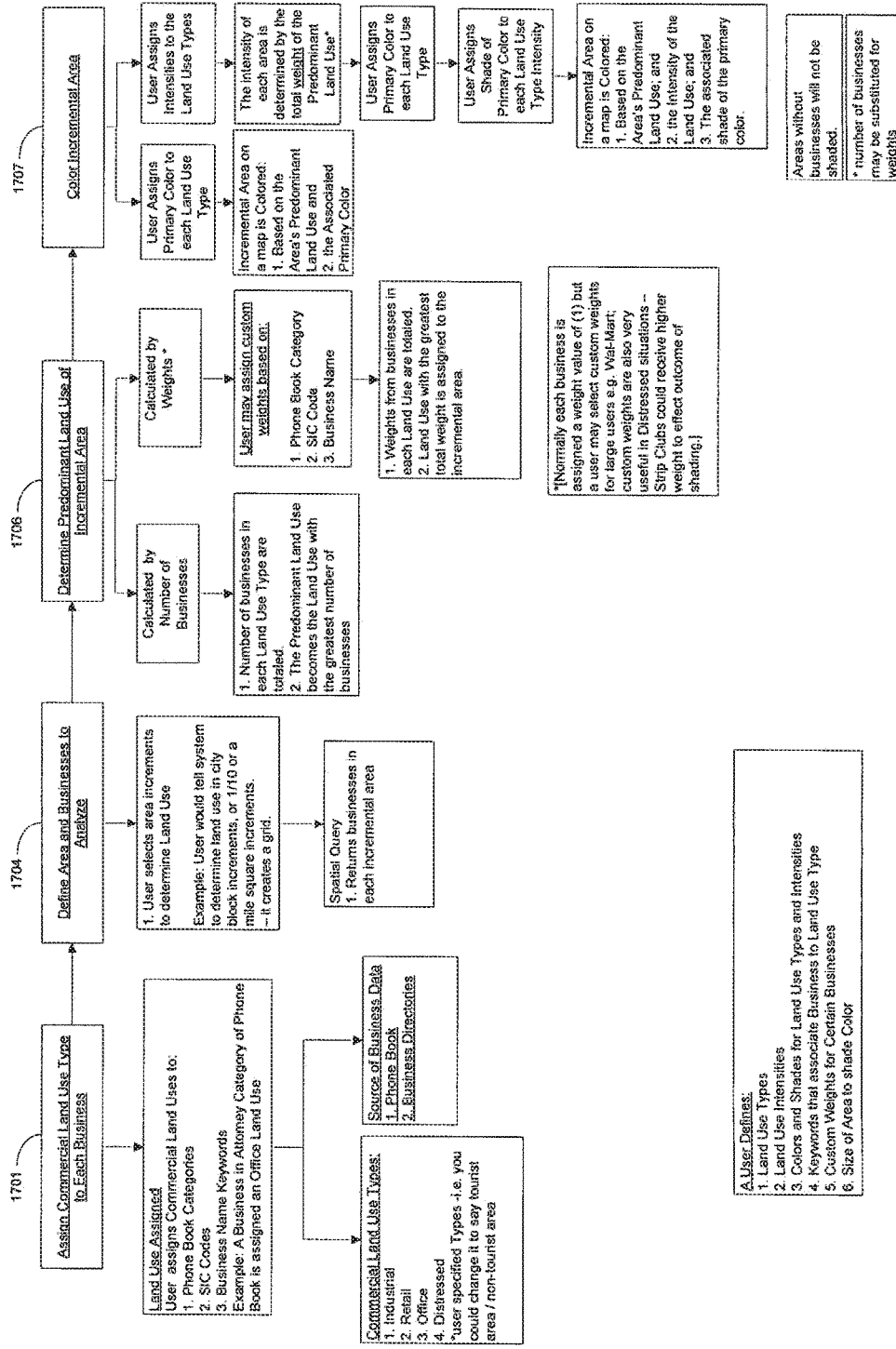
FIG. 17B shows a flowchart of a method illustrating an exemplary embodiment for coloring a map based on actual land use.

Referring now to FIGS. 16, 17A, and 17B, a further exemplary embodiment of the present invention 100 creates an Actual Land Use Map 1600. The Actual Land Use Map or an As Built Map 1600 is a map which displays to the user with colors and shapes, the predominant land use type in a given incremental area of the map. The database 138 used to create the Actual Land Use Map is populated with business data and telephone directory business data. A benefit of using the Actual Land Use Map over a zoning or future land use map is that the map displays how the land is currently being utilized. This map 1600 is useful to a commercial real estate site selector or decision maker who is unfamiliar with an area where the site selector is looking for sites. It helps identify the location, type and quality of commercial corridors. Combined with the home price map, a site selector can identify strong commercial corridors and their relation to the location and quality of neighborhoods.

The Actual Land Use Map 1600 can be generated by a computer or by hand, and the result can be displayed on a computer visual interface 162 or in a printout paper map. One exemplary embodiment of the Actual Land Use Map 1600 is to use this business data/color system in a commercial real estate context to create an actual land use map 1600 by defining the categories as retail, industrial, distressed, and office 1602.

Referring now to FIG. 17A, a method 1700 for creating this map 1600 will now be described in general, with additional detail following below and in FIG. 17B. A commercial land use type is assigned to each business in a database 1701. A selected area of the map 1702 is divided into incremental shaped areas 1703. A spatial query 1704 returns the businesses located within each incremental area 1705. Another query 1706 determines the predominant use in each incremental area based off of the size of the businesses and/or how many businesses of each land use type are located within the incremental area. The application 156 then colors 1707 each incremental area on the map based on the predominant use 1706 in that incremental area.

The shade of the color indicates how strong the use is in the specified area 1602. For example, an incremental area with 10 office buildings will be shaded dark blue, whereas an incremental area with 1 office building will be shaded light blue. An incremental area with no businesses will not be shaded any color.

Referring now to FIG. 17B, the method used to produce the Actual Land Use Map 1600 will now be described in more detail.

Referring to 1701 of FIG. 17B, a database query assigns commercial land use types to each business based upon its phone book category, SIC codes and business name keywords. The user can define a relationship between a phone book category, for example, Attorneys, and a land use type, which in the case of Attorney would be an Office land use type. In an exemplary embodiment used in a commercial real estate context, land use types can be classified as industrial, retail, office and distressed. Distressed represents areas where certain business types indicate lower commercial quality. The business data may be derived from any source that can be geocoded. Current phone book listings and current business directories provide the means to create an Actual Land Use map that provides current utilization of the land.

Referring to 1704 of FIG. 17B, a user or automatic database function selects the incremental area size to calculate the predominant land use type. An example could be the size of a city block, another example could be a $\frac{1}{10}^{th}$ of a mile square increment. A spatial query than returns all of the businesses that are located in each incremental area.

Referring to 1706 of FIG. 17B, a query determines the predominant land use in each incremental area. The predominant land use may be calculated by the following methods: by determining the land use type which has the greatest number of businesses, or the predominant land use may be calculated using a system of weights. The user may assign custom weights based on phone book categories, SIC codes and business name keywords. Normally each business is assigned a weight of 1, but a large business such as a Wal-Mart SuperCenter may receive a weight greater than 1. The weights from businesses in each land use type are totaled and the land use type with the greatest total weight is assigned to the incremental area.

Referring to 1707 of FIG. 17B, once the predominant land use type is determined for the incremental area the incremental area 1601 can be colored on a map 1600. A user may assign a primary color to each land use type. The user may also assign intensities to the land use types 1602. The intensity of each area is determined by the total weight or number of businesses used to determine the predominant land use. The user assigns a shade of primary color to each land use intensity. For example: the user assigns the color orange to the industrial land use type, and if designating intensities, assigns a light shade of orange for a lightly used industrial area, and a dark shade of orange for a densely used industrial area. If no businesses exist in the area of the square or shape, then no color is assigned to that area. An alternative aspect of this exemplary embodiment is to shade the no business region with a specified color.

A benefit of the Actual Land Use Map is that once each incremental area has been colored according to the predominant land use, a user such as a commercial site selector can identify areas that are commercial corridors versus areas which have no commercial development. For example, when looking at a plain road map, it is often difficult to discern which roads in an unfamiliar area have the most commercial activity. On the Actual Land Use Map, a road with many commercial retailers will have many consecutive incremental areas that are shaded the assigned retail color, and areas with no commercial development will have no color shading. Typical downtown areas are often filled with the incremental areas shaded the assigned color for office, because large skyscrapers or office buildings house many office type tenants.

Another exemplary embodiments of the Actual Land Use Map includes a method which draws a shape around several incremental areas that have a single predominant use. For example, a downtown area that has a predominant use as office space, will have many squares or shapes that are shaded dark blue. The system will draw a shape around the area where a specified number and percentage of incremental areas are blue. This will help the user determine, amongst other conclusions, where the office district is located.

Another exemplary embodiment of the Actual Land Use Map will color the squares or shapes of each incremental area for other purposes other than a commercial real estate context. For example, the map can be geared towards visiting tourists in a city. The map can color shapes or squares depending on whether the shape or square has a predominant use of tourist activities. For example, if a shape or square has an art museum or a tourist attraction, it may be shaded red. Areas where there are many red shapes could have a box or a shape draw around the area, and this could be called a Tourist District. Hotel locations could be superimposed over the map, and the user could therefore select a hotel in a tourist district as opposed to selecting a hotel in an office district because the tourist wants to be located near tourist activities. The selection of the hotel on the map could point the tourist to the hotel's website or a reservation booking system, or tell the user more information about the hotel including price and amenities.

Additional Methods of Viewing Results

Figure 18:
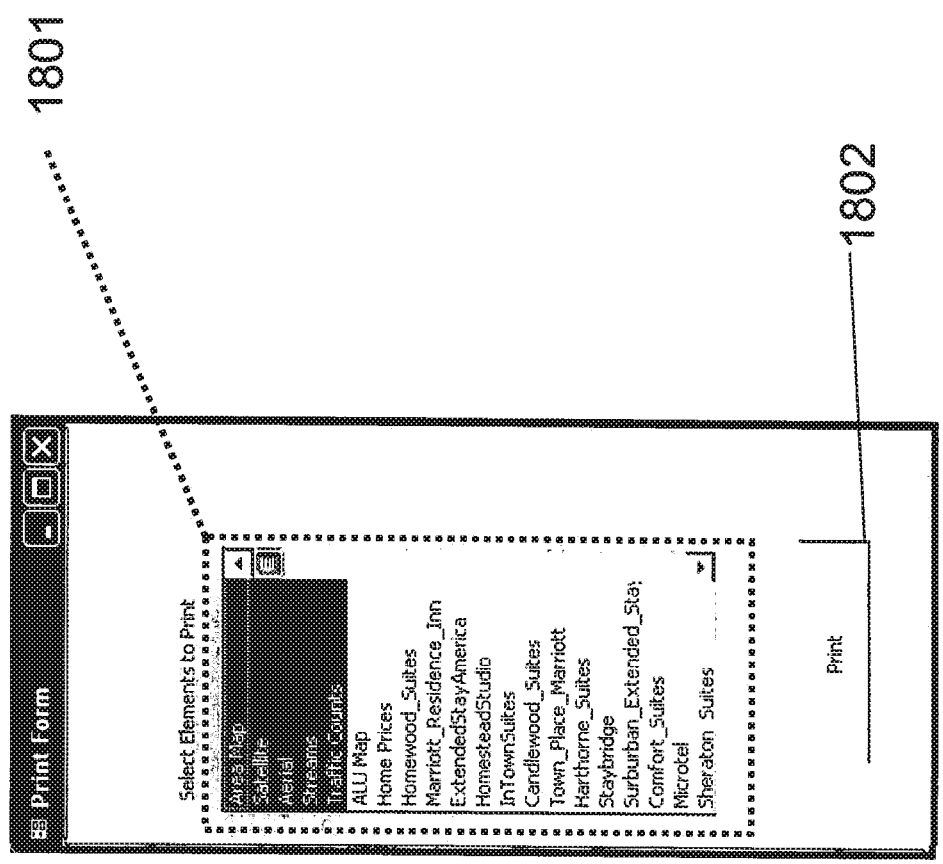
FIG. 18 shows an exemplary data display illustrating an exemplary embodiment of a display to print output created by the system architecture.

Referring now to FIG. 18, in addition to viewing the present invention on a display, a user can create a printout of the selected analysis. The user has several methods to print. A user can select a site on a map 606, and choose options to print 1801. A user can use the search feature that returns sites 1803, and can print the results 1802. A user can select an individual site to print.

Once the user has selected what sites will be printed, the user is presented with an option to choose what variables and their corresponding maps to print 1801. The printing is automated, so that the user can select the sites to run analysis on, and print, and perform other tasks while the system creates maps and analysis and prints the results for each site.

Possible Sources of Operating Revenue

There are numerous possible sources of operating revenue for the system operator using the system in the present invention. The system operator can obtain revenue through a subscription service by charging access to the system. In addition, the system operator can obtain revenue through internet based sales; through a subscription service for installation and support of the system on a user's computer; licensing the different technologies to various vendors; click throughs to homes for sale and real estate commissions; and click throughs to hotel bookings and event, movie, and tourist attraction booking.

An exemplary embodiment of the present invention 100 enables buyers and sellers identify and analyze commercial real estate in an efficient and organized method. The system and method combines data from a number of sources and creates an analysis output which allows the user to make a rapid, informed commercial real estate decision. The system and method provides an efficient and detailed analysis by presenting the user with a method to collect and store data in the field, produce analysis to determine the viability of a commercial real estate site or project, and save the results for future display, distribution, and review.

In describing representative exemplary embodiments of the present invention, the specification may have presented a method and/or process of the present invention as a particular sequence of steps. However, to the extent that the method or process does not rely on a particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of exemplary embodiments of the present invention has been presented for purposes of illustration and description. It is not intended to be exhaustive or to limit the invention to the precise forms disclosed. Many variations and modifications of the exemplary embodiments described herein will be obvious to one of ordinary skill in the art in light of the above disclosure. The scope of the invention is to be defined only by the claims, and by their equivalents.

Therefore, the following is claimed:

1. A system, comprising:
   at least one computer system;
   an application executable by the at least one computer system, wherein when executed the application causes the at least one computer system to at least:
   identify, through a user interface, a user-selection of a potential site location and a plurality of retailers;
   identify a plurality of retail locations associated with a respective retailer of the plurality of retailers;
   determine, for the respective retailer, a plurality of retail location demographic values, wherein a respective retail location demographic value of the plurality of retail location demographic values is calculated to be within a predetermined distance from a respective one of the plurality of retail locations;
   define a plurality of trade areas for the plurality of retail locations, wherein a trade area diameter around a respective trade area is selected to envelop a demographic value that matches an average demographic value for the plurality of retail locations that is calculated as an average of the plurality of retail location demographic values; and
   render, on a display of a client device, the user interface comprising a tabbed user interface that shows a plurality of map tabs corresponding to a plurality of maps for the plurality of retailers, a respective map showing a plurality of retail location radii representing the plurality of trade areas around the plurality of retail locations associated with the respective retailer corresponding to a selected tab, wherein all of the plurality of maps for all of the plurality of retailers are represented at a same map height and all of the plurality of maps are centered on the potential site location; and update the user interface to include a listing of: the average demographic value, and a site demographic value within the predetermined distance of the potential site location, wherein the site demographic value is shown as a particular color according to a standard deviation grouping identified for the site demographic value in view of the average demographic value and the plurality of retail location demographic values.

2. The system of claim 1, wherein the trade area diameter is increased until the demographic value meets or exceeds the average demographic value.

3. The system of claim 1, wherein the respective map comprises a potential trade area of the user-selected potential site location.

4. The system of claim 3, wherein a potential trade area diameter of the potential trade area is increased until a demographic value within the potential trade area diameter meets or exceeds the average demographic value for the plurality of retail locations.

5. The system of claim 4, wherein the retail location radii are color-coded based at least in part on a relationship to a predetermined value.

6. The system of claim 1, wherein a geographic region is expanded from the potential site location until the geographic region includes a predetermined number of retail locations to identify the plurality of retail locations.

7. The system of claim 1, wherein the respective retail location demographic value is a population within the predetermined distance from the respective one of the plurality of retail locations.

8. The system of claim 1, wherein the respective retail location demographic value is an average household income within the predetermined distance from the respective one of the plurality of retail locations.

9. A method implemented by instructions executed by a computing device, the method comprising:
identifying, through a user interface, a user-selection of a potential site location and a plurality of retailers;
identifying a plurality of retail locations associated with a respective retailer of the plurality of retailers;
determining, for the respective retailer, a plurality of retail location demographic values, wherein a respective retail location demographic value of the plurality of retail location demographic values is calculated to be within a predetermined distance from a respective one of the plurality of retail locations;
defining a plurality of trade areas for the plurality of retail locations, wherein a diameter of the trade area around a respective trade area is selected to envelop a demographic value that matches an average demographic value that is calculated as an average of the plurality of retail location demographic values;
rendering, on a display of a client device, the user interface comprising a tabbed user interface that shows a plurality of map tabs corresponding to a plurality of maps for the plurality of retailers, a respective map showing a plurality of retail location radii representing the plurality of trade areas around the plurality of retail locations associated with the respective retailer corresponding to a selected tab, wherein all of the plurality of maps for all of the plurality of retailers are represented at a same map height and all of the plurality of maps are centered on the potential site location; and
updating the user interface to include a listing of: the average demographic value, and a site demographic value within the predetermined distance of the potential site location, wherein the site demographic value is shown as a particular color according to a standard deviation grouping identified for the site demographic value in view of the average demographic value and the plurality of retail location demographic values.

10. The method of claim 9, wherein the diameter of the trade area is increased until the demographic value meets or exceeds the average demographic value.

11. The method of claim 9, wherein the respective map comprises a potential trade area of the user-selected potential site location.

12. The method of claim 11, wherein a potential trade area diameter of the potential trade area is increased until a demographic value within the potential trade area diameter meets or exceeds the average demographic value for the plurality of retail locations.

13. The method of claim 11, wherein the retail location radii are color-coded based at least in part on a relationship to a predetermined value.

14. The method of claim 9, wherein a geographic region is expanded from the potential site location until the geographic region includes a predetermined number of retail locations to identify the plurality of retail locations.

15. The method of claim 9, wherein the respective retail location demographic value is a population within the predetermined distance from the respective one of the plurality of retail locations.

16. The method of claim 9, wherein the respective retail location demographic value is an average household income within the predetermined distance from the respective one of the plurality of retail locations.

17. A non-transitory computer-readable medium embodying a program executable in at least one computing device that, when executed, causes the at least one computing device to:
identify, through a user interface, a user-selection of a potential site location and a plurality of retailers;
identify a plurality of retail locations associated with a respective retailer of the plurality of retailers;
determine, for the respective retailer, a plurality of retail location demographic values, wherein a respective retail location demographic value of the plurality of retail location demographic values is calculated to be within a predetermined distance from a respective one of the plurality of retail locations;
define a plurality of trade areas for the plurality of retail locations, wherein a trade area diameter around a respective trade area is selected to envelop a demographic value that matches an average demographic value for the plurality of retail locations that is calculated as an average of the plurality of retail location demographic values;
render, on a display of a client device, the user interface comprising a tabbed user interface that shows a plurality of map tabs corresponding to a plurality of maps for the plurality of retailers, a respective map showing a plurality of retail location radii representing the plurality of trade areas around the plurality of retail locations associated with the respective retailer corresponding to a selected tab, wherein all of the plurality of maps for all of the plurality of retailers are represented at a same map height and all of the plurality of maps are centered on the potential site location; and
update the user interface to include a listing of: the average demographic value, and a site demographic value within the predetermined distance of the potential site location, wherein the site demographic value is shown as a particular color according to a standard deviation grouping identified for the site demographic value in view of the average demographic value and the plurality of retail location demographic values.

18. The non-transitory computer-readable medium of claim 17, wherein the trade area diameter is increased until the demographic value meets or exceeds the average demographic value.

19. The non-transitory computer-readable medium of claim 17, wherein the predetermined distance is a user-selected radius.

20. The non-transitory computer-readable medium of claim 17, wherein the respective map comprises a potential trade area of the user-selected potential site location.

* * * * *